United States Patent
Byrne et al.

(10) Patent No.: US 11,505,746 B2
(45) Date of Patent: Nov. 22, 2022

(54) VEGETABLE OIL-BASED ALKOXYLATES AND METHODS OF MAKING SUCH

(71) Applicant: Indorama Ventures Oxides LLC, The Woodlands, TX (US)

(72) Inventors: Heather Byrne, Houston, TX (US); George A. Smith, Conroe, TX (US); Hungchang Calvin Chiu, Spring, TX (US); Jeffrey Cellura, Spring, TX (US); Xiaohua Fang, Spring, TX (US)

(73) Assignee: Indorama Ventures Oxides LLC, The Woodlands, TX (US)

( * ) Notice: Subject to any disclaimer, the term of this patent is extended or adjusted under 35 U.S.C. 154(b) by 677 days.

(21) Appl. No.: 16/469,839

(22) PCT Filed: Dec. 11, 2017

(86) PCT No.: PCT/US2017/065536
§ 371 (c)(1),
(2) Date: Jun. 14, 2019

(87) PCT Pub. No.: WO2018/111746
PCT Pub. Date: Jun. 21, 2018

(65) Prior Publication Data
US 2020/0094207 A1 Mar. 26, 2020

Related U.S. Application Data

(60) Provisional application No. 62/434,470, filed on Dec. 15, 2016.

(51) Int. Cl.
*C11D 1/72* (2006.01)
*C11D 1/74* (2006.01)
(Continued)

(52) U.S. Cl.
CPC .......... *C09K 23/018* (2022.01); *A01N 25/04* (2013.01); *C04B 24/085* (2013.01);
(Continued)

(58) Field of Classification Search
CPC .. C11D 1/72; C11D 1/74; C11D 1/825; C11D 3/20; C07C 69/003; C07C 69/02
See application file for complete search history.

(56) References Cited

U.S. PATENT DOCUMENTS 5,362,894 A 11/1994 Handwerker et al.
5,403,509 A * 4/1995 Pujol ........................ C11D 1/74
510/237

(Continued)

FOREIGN PATENT DOCUMENTS

EP 0586323 A1 3/1994

OTHER PUBLICATIONS

International Search Report and Written Opinion received in corresponding PCT Application PCT/US17/65536, dated Feb. 6, 2018.

*Primary Examiner* — Brian P Mruk
(74) *Attorney, Agent, or Firm* — Indorama Ventures Oxides LLC; Edward Korompai

(57) ABSTRACT

A vegetable oil-based alkoxylate composition comprising a mixture of mono-, di-, and/or triacyl alkoxylated glycerides and alkoxylated glycerin. A method of reacting a vegetable oil and an alkoxylated glycerin via a transesterification reaction to produce a vegetable oil-based alkoxylate composition.

9 Claims, 6 Drawing Sheets

(51) Int. Cl.
*C11D 1/825* (2006.01)
*C11D 3/20* (2006.01)
*C07C 69/003* (2006.01)
*C07C 69/02* (2006.01)
*C09K 23/00* (2022.01)
*A01N 25/04* (2006.01)
*C04B 24/08* (2006.01)
*C09D 17/00* (2006.01)
*C04B 103/40* (2006.01)

(52) U.S. Cl.
CPC ............ *C09D 17/001* (2013.01); *C09K 23/00* (2022.01); *C11D 1/825* (2013.01); *C04B 2103/408* (2013.01); *C11D 1/72* (2013.01); *C11D 1/721* (2013.01)

(56) References Cited

U.S. PATENT DOCUMENTS

| | | |
|---|---|---|
| 5,986,117 A | 11/1999 | Cooper |
| 6,274,540 B1 | 8/2001 | Scheibel et al. |
| 6,306,817 B1 | 10/2001 | Kott et al. |
| 6,566,308 B1 | 5/2003 | Aven |
| RE38,639 E | 10/2004 | Oses et al. |
| 2007/0287820 A1 | 12/2007 | Weirich |
| 2008/0234165 A1 | 9/2008 | Panandiker et al. |
| 2012/0016039 A1 | 1/2012 | Amari et al. |
| 2016/0355750 A1 | 12/2016 | Wang et al. |

\* cited by examiner

VEGETABLE OIL-BASED ALKOXYLATES AND METHODS OF MAKING SUCH

CROSS-REFERENCE TO RELATED APPLICATIONS

This application is the National Phase of International Application PCT/US2017/065536 filed Dec. 11, 2017 which designated the U.S. and which claims priority to U.S. Provisional Patent Application No. 62/434,470 filed Dec. 15, 2016. The noted applications are incorporated herein by reference.

STATEMENT REGARDING FEDERALLY SPONSORED RESEARCH OR DEVELOPMENT

Not applicable.

FIELD

The present disclosure is generally directed to a composition comprising a mixture of vegetable oil-based alkoxylates and uses thereof. The present disclosure is also directed to a method of reacting a vegetable oil and an alkoxylated glycerin via a transesterification reaction to produce a composition comprising a mixture of vegetable oil-based alkoxylates (i.e., mono-, di-, and/or triacyl alkoxylated glycerides) and alkoxylated glycerin.

BACKGROUND

Typically, vegetable oil-based alkoxylates (also referred to herein as "vegetable oil alkoxylates") are prepared by direct alkoxylation of one or more vegetable oils using base catalysts. The direct alkoxylation process generally comprises: (i) reacting a vegetable oil such as coconut oil or palm kernel oil with methanol using a base catalyst to form a methyl ester and, thereafter, removing the glycerin byproduct, (ii) hydrogenating the methyl ester to form an alcohol, and (iii) reacting the alcohol with ethylene oxide ("EO") and/or propylene oxide ("PO") to make the vegetable oil alkoxylate. EP 0586323 discloses a detergent composition comprising mono-, di-, and tri-ester compounds prepared by direct alkoxylation of coconut oil and palm oil.

Various references (e.g., U.S. RE38,639, US 2012/0016039, and U.S. Pat. No. 5,986,117) also teach the transesterification of vegetable oils and alkoxylated glycerin to form vegetable oil alkoxylates. However, such references fail to teach the presently disclosed composition comprising a specific mixture of vegetable oil alkoxylates and alkoxylated glycerin, or the methods of making and using such.

It is an object of the present disclosure to provide a composition comprising a mixture of vegetable oil-based alkoxylates and alkoxylated glycerin (also referred to herein as "a vegetable oil-based alkoxylate composition") having comparable or improved properties over the relevant prior art. It is also an object of the present disclosure to provide a method of reacting a vegetable oil and an alkoxylated glycerin via a transesterification reaction to produce the aforementioned vegetable oil-based alkoxylate composition comprising a mixture of vegetable-oil based alkoxylates and alkoxylated glycerin.

FIGURES

DETAILED DESCRIPTION

Figure 1:
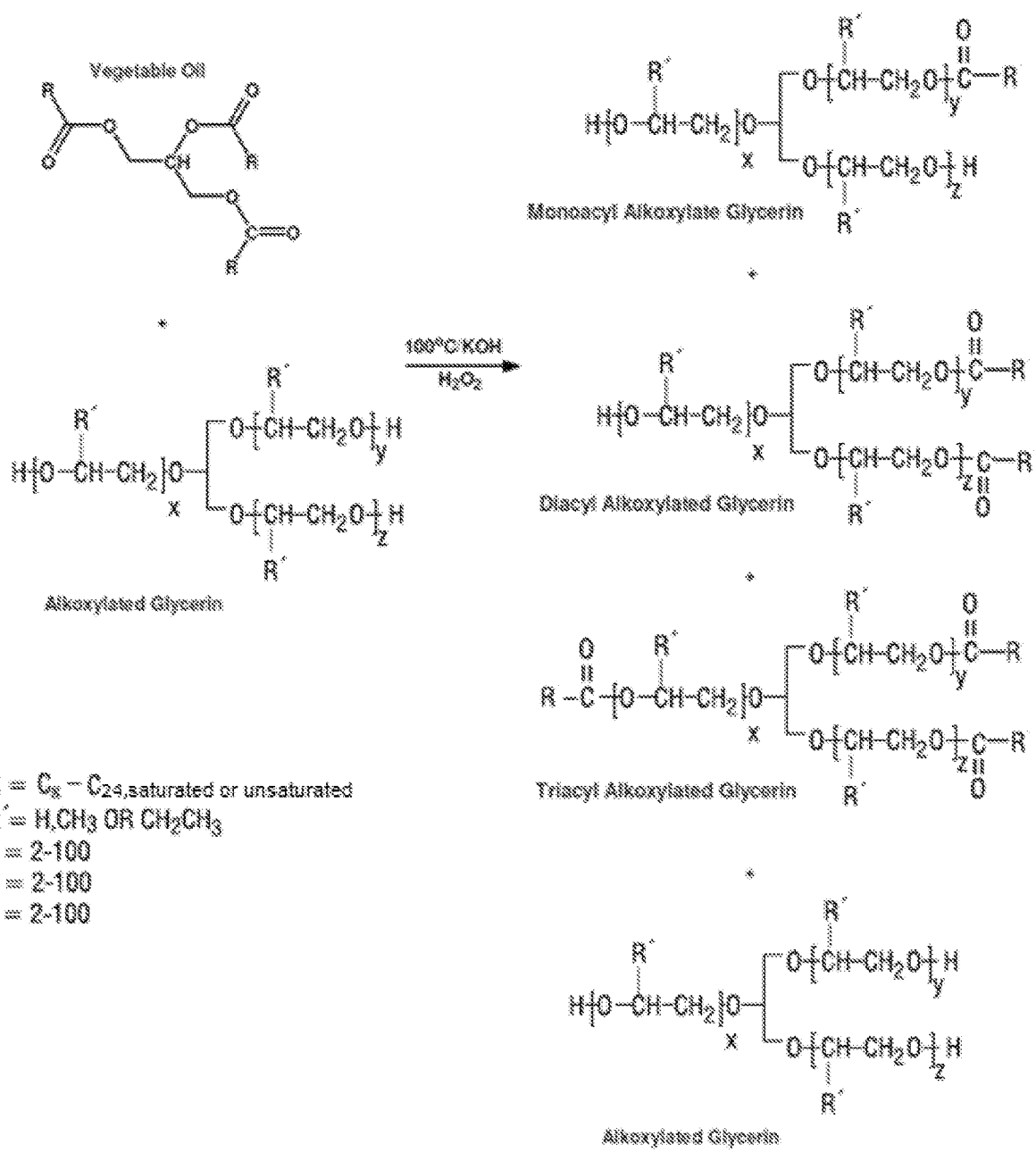
FIG. 1 is a representative illustration of the reaction mechanism for producing the presently disclosed vegetable oil-based alkoxylate composition.

Before explaining at least one embodiment of the present disclosure in detail, it is to be understood that the present disclosure is not limited in its application to the details of construction and the arrangement of components or steps or methodologies set forth in the following description or illustrated in the drawings. The present disclosure is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the present disclosure shall have the meanings that are commonly understood by those having ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference to the extent that they do not contradict the instant disclosure.

All of the compositions and/or methods disclosed herein can be made and executed without undue experimentation in light of the present disclosure. While the compositions and methods of the present disclosure have been described in terms of preferred embodiments, it will be apparent to those having ordinary skill in the art that variations may be applied to the compositions and/or methods and in the steps or sequences of steps of the methods described herein without departing from the concept, spirit, and scope of the present disclosure. All such similar substitutes and modifications apparent to those skilled in the art are deemed to be within the spirit, scope, and concept of the present disclosure.

As utilized in accordance with the present disclosure, the following terms, unless otherwise indicated, shall be understood to have the following meanings.

The use of the word "a" or "an", when used in conjunction with the term "comprising", "including", "having", or "containing" (or variations of such terms) may mean "one", but it is also consistent with the meaning of "one or more", "at least one", and "one or more than one".

The use of the term "or" is used to mean "and/or" unless clearly indicated to refer solely to alternatives and only if the alternatives are mutually exclusive.

Throughout this disclosure, the term "about" is used to indicate that a value includes the inherent variation of error for the quantifying device, mechanism, or method, or the inherent variation that exists among the subject(s) to be measured. For example, but not by way of limitation, when the term "about" is used, the designated value to which it refers may vary by plus or minus ten percent, or nine percent, or eight percent, or seven percent, or six percent, or five percent, or four percent, or three percent, or two percent, or one percent, or one or more fractions therebetween.

The use of "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it refers. In addition, the quantities of 100/1000 are not to be considered as limiting since lower or higher limits may also produce satisfactory results.

In addition, the phrase "at least one of X, Y, and Z" will be understood to include X alone, Y alone, and Z alone, as well as any combination of X, Y, and Z. Likewise, the phrase "at least one of X and Y" will be understood to include X alone, Y alone, as well as any combination of X and Y. Additionally, it is to be understood that the phrase "at least one of" can be used with any number of components and have the similar meanings as set forth above.

The use of ordinal number terminology (i.e., "first", "second", "third", "fourth", etc.) is solely for the purpose of differentiating between two or more items and, unless otherwise stated, is not meant to imply any sequence or order or importance to one item over another or any order of addition.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The phrases "or combinations thereof" and "and combinations thereof" as used herein refers to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB. Continuing with this example, expressly included are combinations that contain repeats of one or more items or terms such as BB, AAA, CC, AABB, AACC, ABCCCC, CBBAAA, CABBB, and so forth. The skilled artisan will understand that typically there is no limit on the number of items or terms in any combination, unless otherwise apparent from the context. In the same light, the term "and combinations thereof" when used with the phrase "selected from the group consisting of" refers to all permutations and combinations of the listed items preceding the phrase.

The phrases "in one embodiment", "in an embodiment", "according to one embodiment", and the like generally mean the particular feature, structure, or characteristic following the phrase is included in at least one embodiment of the present disclosure, and may be included in more than one embodiment of the present disclosure. Importantly, such phrases are non-limiting and do not necessarily refer to the same embodiment but, of course, can refer to one or more preceding and/or succeeding embodiments. For example, in the appended claims, any of the claimed embodiments can be used in any combination.

As used herein, the terms "% by weight", "wt. %", "weight percent", or "percentage by weight" are used interchangeably and, unless stated otherwise, are based on the total weight of the referenced composition.

The phrase "substantially free" shall be used herein to mean present in an amount less than 1 weight percent, or less than 0.1 weight percent, or less than 0.01 weight percent based on the total weight of the referenced composition.

The term "alkyl" is inclusive of both straight chain and branched chain groups and of cyclic groups. In some embodiments, the alkyl group may have up to 40 carbon atoms (in some embodiments up to 30, 20, 15, 12, 10, 8, 7, 6, or 5 carbon atoms) unless otherwise specified. Cyclic groups can be monocyclic or polycyclic, and in some embodiments, can have from 3 to 10 carbon atoms.

Unless otherwise specified, the reaction conditions disclosed herein are intended to be at atmospheric pressure, i.e., about 101 kPa.

As used herein, the term "vegetable oil-based alkoxylate" can refer to monoacyl alkoxylated glyceride, diacyl alkoxylated glyceride, or triacyl alkoxylated glyceride produced from the reaction of a vegetable oil and alkoxylated glycerin. The plural form, "vegetable oil-based alkoxylates", refers to one or more of monoacyl alkoxylated glyceride, diacyl alkoxylated glyceride, and/or triacyl alkoxylated glyceride produced from the reaction of one or more vegetable oils and alkoxylated glycerin.

The term "pesticide" refers to at least one pesticide selected from the group consisting of a fungicide, insecticide, nematicide, herbicide, a safener, a plant growth regulator and a mixture thereof. In one particular aspect, the pesticide is selected from the group consisting of a fungicide, insecticide, herbicide and a mixture thereof. The person skilled in the art is familiar with such pesticides, which can be found in, for example, the Pesticide Manual, 15th Ed. (2011), The British Crop Protection Council, London.

"Fungicide" means an active ingredient that kills, controls or otherwise adversely modifies the growth of a fungal pathogen. Examples of fungicides that can be employed in the present disclosure include, but are not limited to, (3-ethoxypropyl)-mercury bromide, 2-methoxyethylmercury chloride, 2-phenylphenol, 8-hydroxyquinoline sulfate, 8-phenylmercurioxyquinoline, acibenzolar, acibenzolar-S-methyl, acypetacs, acypetacs-copper, acypetacs-zinc, aldimorph, allyl alcohol, ametoctradin, am isulbrom, ampropylfos, anilazine, aureofungin, azaconazole, azithiram, azoxystrobin, barium polysulfide, benalaxyl, benalaxyl-M, benodanil, benomyl, benquinox, bentaluron, benthiavalicarb, benthiavalicarb-isopropyl, benzalkonium chloride, benzamacril, benzamacril-isobutyl, benzamorf, benzohydroxamic acid, bethoxazin, binapacryl, biphenyl, bitertanol, bithionol, bixafen, blasticidin-S, Bordeaux mixture, boscalid, bromuconazole, bupirimate, Burgundy mixture, buthiobate, butylamine, calcium polysulfide, captafol, captan, carbamorph, carbendazim, carboxin, carpropamid, carvone, Cheshunt mixture, chinomethionat, chlobenthiazone, chloraniformethan, chloranil, chlorfenazole, chlorodinitronaphthalene, chloroneb, chloropicrin, chlorothalonil, chlorquinox, chlozolinate, climbazole, clotrimazole, copper acetate, copper carbonate, basic, copper hydroxide, copper naphthenate, copper oleate, copper oxychloride, copper silicate, copper sulfate, copper zinc chromate, cresol, cufraneb, cuprobam, cuprous oxide, cyazofam id, cyclafuram id, cycloheximide, cyflufenam id, cymoxanil, cypendazole, cyproconazole, cyprodinil, dazomet, dazomet-sodium, DBCP, debacarb, decafentin, dehydroacetic acid, dichlofluanid, dichlone, dichlorophen, dichlozoline, diclobutrazol, diclocymet, diclomezine, diclomezine-sodium, dicloran, diethofencarb, diethyl pyrocarbonate, difenoconazole, diflumetorim, dimethirimol, dimethomorph, dimoxystrobin, diniconazole, diniconazole-M, dinobuton, dinocap, dinocap-4, dinocap-6, dinocton, dinopenton, dinosulfon, dinoterbon, diphenylamine, dipyrithione, disulfiram, ditalimfos, dithianon, DNOC, DNOC-ammonium, DNOC-potassium, DNOC-sodium, dodemorph, dodemorph acetate, dodemorph benzoate, dodicin, dodicin-sodium, dodine, drazoxolon, edifenphos, epoxiconazole, etaconazole, etem, ethaboxam, ethirimol, ethoxyquin, ethylmercury 2,3-dihydroxypropyl mercaptide, ethylmercury acetate, ethylmercury bromide, ethylmercury chloride, ethylmercury phosphate, etridiazole, famoxadone, fenamidone, fenaminosulf, fenapanil, fenarimol, fenbuconazole, fenfuram, fenhexam id, fenitropan, fenoxanil, fenpiclonil, fenpropidin, fenpropimorph, fentin, fentin chloride, fentin hydroxide, ferbam, ferimzone, fluazinam, fludioxonil, flumetover, flumorph, fluopicolide, fluopyram, fluoroimide, fluotrimazole, fluoxastrobin, fluquinconazole, flusilazole, flusulfamide, flutianil, flutolanil, flutriafol, fluxapyroxad, folpet, formaldehyde, fosetyl, fosetyl-aluminium, fuberidazole, furalaxyl, furametpyr, furcarbanil, furconazole, furconazole-cis, furfural, furmecyclox, furophanate, glyodin, griseofulvin, guazatine, halacrinate, hexachlorobenzene, hexachlorobutadiene, hexaconazole, hexylthiofos, hydrargaphen, hymexazol, imazalil, imazalil nitrate, imazalil sulfate, imibenconazole, iminoctadine, iminoctadine triacetate, iminoctadine trialbesilate, iodomethane, ipconazole, iprobenfos, iprodione, iprovalicarb, isoprothiolane, isopyrazam, isotianil, isovaledione, kasugamycin, kresoxim-methyl, mancopper, mancozeb, mandipropam id, maneb, mebenil, mecarbinzid, mepanipyrim, mepronil, meptyldinocap, mercuric chloride, mercuric oxide, mercurous chloride, metalaxyl, metalaxyl-M, metam, metam-ammonium, metam-potassium, metam-sodium, metazoxolon, metconazole, methasulfocarb, methfuroxam, methyl bromide, methyl isothiocyanate, methylmercury benzoate, methylmercury dicyandiamide, methylmercury pentachlorophenoxide, metiram, metominostrobin, metrafenone, metsulfovax, milneb, myclobutanil, myclozolin, N-(ethylmercury)-p-toluene-sulphonanilide, nabam, natamycin, nitrostyrene, nitrothal-isopropyl, nuarimol, OCH, octhilinone, ofurace, orysastrobin, oxadixyl, oxine-copper, oxpoconazole, oxpoconazole fumarate, oxycarboxin, pefurazoate, penconazole, pencycuron, penflufen, pentachlorophenol, penthiopyrad, phenylmercuriurea, phenylmercury acetate, phenylmercury chloride, phenylmercury derivative of pyrocatechol, phenylmercury nitrate, phenylmercury salicylate, phosdiphen, phthalide, picoxystrobin, piperalin, polycarbamate, polyoxins, polyoxorim, polyoxorim-zinc, potassium azide, potassium polysulfide, potassium thiocyanate, probenazole, prochloraz, procymidone, propamocarb, propamocarb hydrochloride, propiconazole, propineb, proquinazid, prothiocarb, prothiocarb hydrochloride, prothioconazole, pyracarbolid, pyraclostrobin, pyraclostrobin, pyrametostrobin, pyraoxystrobin, pyrazophos, pyribencarb, pyridinitril, pyrifenox, pyrimethanil, pyriofenone, pyroquilon, pyroxychlor, pyroxyfur, quinacetol, quinacetol sulfate, quinazam id, quinconazole, quinoxyfen, quintozene, rabenzazole, salicylanilide, sedaxane, silthiofam, simeconazole, sodium azide, sodium orthophenylphenoxide, sodium pentachlorophenoxide, sodium polysulfide, spiroxamine, streptomycin, sulfur, sultropen, TCMTB, tebuconazole, tebufloquin, tecloftalam, tecnazene, tecoram, tetraconazole, thiabendazole, thiadifluor, thicyofen, thifluzamide, thiochlorfenphim, thiomersal, thiophanate, thiophanate-methyl, thioquinox, thiram, tiadinil, tioxym id, tolclofos-methyl, tolylfluanid, tolylmercury acetate, triadimefon, triadimenol, triamiphos, triarimol, triazbutil, triazoxide, tributyltin oxide, trichlamide, tricyclazole, tridemorph, trifloxystrobin, triflumizole, triforine, triticonazole, uniconazole, uniconazole-P, validamycin, valifenalate, vinclozolin, zarilam id, zinc naphthenate, zineb, ziram, zoxamide and mixtures thereof.

"Insecticide" means an active ingredient that kills, controls or otherwise adversely modifies the growth of an insect. Examples of insecticides that can be employed in the present disclosure include, but are not limited to, 1,2-dichloropropane, abamectin, acephate, acetamiprid, acethion, acetoprole, acrinathrin, acrylonitrile, alanycarb, aldicarb, aldoxycarb, aldrin, allethrin, allosamidin, allyxycarb, alpha-cypermethrin, alpha-ecdysone, alpha-endosulfan, am idithion, aminocarb, amiton, amiton oxalate, amitraz, anabasine, athidathion, azadirachtin, azamethiphos, azinphos-ethyl, azinphos-methyl, azothoate, barium hexafluorosilicate, barthrin, bendiocarb, benfuracarb, bensultap, beta-cyfluthrin, beta-cypermethrin, bifenthrin, bioallethrin, bioethanomethrin, biopermethrin, bistrifluoron, borax, boric acid, bromfenvinfos, bromocyclen, bromo-DDT, bromophos, bromophos-ethyl, bufencarb, buprofezin, butacarb, butathiofos, butocarboxim, butonate, butoxycarboxim, cadusafos, calcium arsenate, calcium polysulfide, camphechlor, carbanolate, carbaryl, carbofuran, carbon disulfide, carbon tetrachloride, carbophenothion, carbosulfan, cartap, cartap hydrochloride, chlorantraniliprole, chlorbicyclen, chlordane, chlordecone, chlordimeform, chlordimeform hydrochloride, chlorethoxyfos, chlorfenapyr, chlorfenvinphos, chlorfluazuron, chlormephos, chloroform, chloropicrin, chlorphoxim, chlorprazophos, chlorpyrifos, chlorpyrifos-methyl, chlorthiophos, chromafenozide, cinerin I, cinerin II, cinerins, cismethrin, cloethocarb, closantel, clothianidin, copper acetoarsenite, copper arsenate, copper naphthenate, copper oleate, coumaphos, coumithoate, crotamiton, crotoxyphos, crufomate, cryolite, cyanofenphos, cyanophos, cyanthoate, cyantraniliprole, cyclethrin, cycloprothrin, cyfluthrin, cyhalothrin, cypermethrin, cyphenothrin, cyromazine, cythioate, DDT, decarbofuran, deltamethrin, demephion, demephion-O, demephion-S, demeton, demeton-methyl, demeton-O, demeton-O-methyl, demeton-S, demeton-S-methyl, demeton-S-methylsulphon, diafenthiuron, dialifos, diatomaceous earth, diazinon, dicapthon, dichlofenthion, dichlorvos, dicresyl, dicrotophos, dicyclanil, dieldrin, diflubenzuron, dilor, dimefluthrin, dimefox, dimetan, dimethoate, dimethrin, dimethylvinphos, dimetilan, dinex, dinex-diclexine, dinoprop, dinosam, dinotefuran, diofenolan, dioxabenzofos, dioxacarb, dioxathion, disulfoton, dithicrofos, d-limonene, DNOC, DNOC-ammonium, DNOC-potassium, DNOC-sodium, doramectin, ecdysterone, emamectin, emamectin benzoate, EMPC, empenthrin, endosulfan, endothion, endrin, EPN, epofenonane, eprinomectin, esdepalléthrine, esfenvalerate, etaphos, ethiofencarb, ethion, ethiprole, ethoate-methyl, ethoprophos, ethyl formate, ethyl-DDD, ethylene dibromide, ethylene dichloride, ethylene oxide, etofenprox, etrimfos, EXD, famphur, fenamiphos, fenazaflor, fenchlorphos, fenethacarb, fenfluthrin, fenitrothion, fenobucarb, fenoxacrim, fenoxycarb, fenpirithrin, fenpropathrin, fensulfothion, fenthion, fenthion-ethyl, fenvalerate, fipronil, flonicam id, flubendiamide, flucofuron, flucycloxuron, flucythrinate, flufenerim, flufenoxuron, flufenprox, fluvalinate, fonofos, formetanate, formetanate hydrochloride, formothion, formparanate, formparanate hydrochloride, fosmethilan, fospirate, fosthietan, fufenozide, furathiocarb, furethrin, gamma-cyhalothrin, gamma-HCH, halfenprox, halofenozide, HCH, HEOD, heptachlor, heptenophos, heterophos, hexaflumuron, HHDN, hydramethylnon, hydrogen cyanide, hydroprene, hyquincarb, imidacloprid, imiprothrin, indoxacarb, iodomethane, IPSP, isazofos, isobenzan, isocarbophos, isodrin, isofenphos, isofenphosmethyl, isoprocarb, isoprothiolane, isothioate, isoxathion, ivermectin, jasmolin I, jasmolin II, jodfenphos, juvenile hormone I, juvenile hormone II, juvenile hormone III, kelevan, kinoprene, lambda-cyhalothrin, lead arsenate, lepimectin, leptophos, lindane, lirimfos, lufenuron, lythidathion, malathion, malonoben, mazidox, mecarbam, mecarphon, menazon, meperfluthrin, mephosfolan, mercurous chloride, mesulfenfos, metaflumizone, methacrifos, methamidophos, methidathion, methiocarb, methocrotophos, methomyl, methoprene, methothrin, methoxychlor, methoxyfenozide, methyl bromide, methyl isothiocyanate, methylchloroform, methylene chloride, metofluthrin, metolcarb, metoxadiazone, mevinphos, mexacarbate, milbemectin, milbemycin oxime, mipafox, mirex, molosultap, monocrotophos, monomehypo, monosultap, morphothion, moxidectin, naftalofos, naled, naphthalene, nicotine, nifluridide, nitenpyram, nithiazine, nitrilacarb, novaluron, noviflumuron, omethoate, oxamyl, oxydemetonmethyl, oxydeprofos, oxydisulfoton, para-dichlorobenzene, parathion, parathion-methyl, penfluoron, pentachlorophenol, permethrin, phenkapton, phenothrin, phenthoate, phorate, phosalone, phosfolan, phosmet, phosnichlor, phosphamidon, phosphine, phoxim, phoxim-methyl, pirimetaphos, pirimicarb, pirimiphos-ethyl, pirimiphos-methyl, potassium arsenite, potassium thiocyanate, pp'-DDT, prallethrin, precocene I, precocene II, precocene III, primidophos, profenofos, profluralin, profluthrin, promacyl, promecarb, propaphos, propetamphos, propoxur, prothidathion, prothiofos, prothoate, protrifenbute, pymetrozine, pyraclofos, pyrafluprole, pyrazophos, pyresmethrin, pyrethrin I, pyrethrin II, pyrethrins, pyridaben, pyridalyl, pyridaphenthion, pyrifluquinazon, pyrimidifen, pyrimitate, pyriprole, pyriproxyfen, quassia, quinalphos, quinalphos-methyl, quinothion, rafoxanide, resmethrin, rotenone, ryania, sabadilla, schradan, selamectin, silafluofen, silica gel, sodium arsenite, sodium fluoride, sodium hexafluorosilicate, sodium thiocyanate, sophamide, spinetoram, spinosad, spiromesifen, spirotetramat, sulcofuron, sulcofuron-sodium, sulfluram id, sulfotep, sulfoxaflor, sulfuryl fluoride, sulprofos, tau-fluvalinate, tazimcarb, TDE, tebufenozide, tebufenpyrad, tebupirimfos, teflubenzuron, tefluthrin, temephos, TEPP, terallethrin, terbufos, tetrachloroethane, tetrachlorvinphos, tetramethrin, tetramethylfluthrin, theta-cypermethrin, thiacloprid, thiamethoxam, thicrofos, thiocarboxime, thiocyclam, thiocyclam oxalate, thiodicarb, thiofanox, thiometon, thiosultap, thiosultap-disodium, thiosultap-monosodium, thuringiensin, tolfenpyrad, tralomethrin, transfluthrin, transpermethrin, triarathene, triazamate, triazophos, trichlorfon, trichlormetaphos-3, trichloronat, trifenofos, triflumuron, trimethacarb, triprene, vamidothion, vaniliprole, XMC, xylylcarb, zeta-cypermethrin, zolaprofos and mixtures thereof.

"Herbicide" means an active ingredient that kills, controls or otherwise adversely modifies the growth of a plant. Examples of herbicides that can be employed in the present disclosure include, but are not limited to, 4-CPA, 4-CPB, 4-CPP, 2,4-D, 3,4-DA, 2,4-DB, 3,4-DB, 2,4-DEB, 2,4-DEP, 3,4-DP, 2,3,6-TBA, 2,4,5-T, 2,4,5-TB, acetochlor, acifluorfen, aclonifen, acrolein, alachlor, allidochlor, alloxydim, allyl alcohol, alorac, ametridione, ametryn, am ibuzin, am icarbazone, am idosulfuron, am inocyclopyrachlor, am inopyralid, am iprofos-methyl, amitrole, ammonium sulfamate, anilofos, anisuron, asulam, atraton, atrazine, azafenidin, azimsulfuron, aziprotryne, barban, BCPC, beflubutamid, benazolin, bencarbazone, benfluralin, benfuresate, bensulfuron, bensulide, bentazone, benzadox, benzfendizone, benzipram, benzobicyclon, benzofenap, benzofluor, benzoylprop, benzthiazuron, bicyclopyrone, bifenox, bilanafos, bispyribac, borax, bromacil, bromobonil, bromobutide, bromofenoxim, bromoxynil, brompyrazon, butachlor, butafenacil, butamifos, butenachlor, buthidazole, buthiuron, butralin, butroxydim, buturon, butylate, cacodylic acid, cafenstrole, calcium chlorate, calcium cyanamide, cambendichlor, carbasulam, carbetamide, carboxazole chlorprocarb, carfentrazone, CDEA, CEPC, chlomethoxyfen, chloramben, chloranocryl, chlorazifop, chlorazine, chlorbromuron, chlorbufam, chloreturon, chlorfenac, chlorfenprop, chlorflurazole, chlorflurenol, chloridazon, chlorimuron, chlornitrofen, chloropon, chlorotoluron, chloroxuron, chloroxynil, chlorpropham, chlorsulfuron, chlorthal, chlorthiam id, cinidon-ethyl, cinmethylin, cinosulfuron, cisanilide, clethodim, cliodinate, clodinafop, clofop, clomazone, clomeprop, cloprop, cloproxydim, clopyralid, cloransulam, CMA, copper sulfate, CPMF, CPPC, credazine, cresol, cumyluron, cyanatryn, cyanazine, cycloate, cyclosulfamuron, cycloxydim, cycluron, cyhalofop, cyperquat, cyprazine, cyprazole, cyprom id, daimuron, dalapon, dazomet, delachlor, desmedipham, desmetryn, diallate, dicamba, dichlobenil, dichloralurea, dichlormate, dichlorprop, dichlorprop-P, diclofop, diclosulam, diethamquat, diethatyl, difenopenten, difenoxuron, difenzoquat, diflufenican, diflufenzopyr, dimefuron, dimepiperate, dimethachlor, dimethametryn, dimethenam id, dimethenamid-P, dimexano, dimidazon, dinitramine, dinofenate, dinoprop, dinosam, dinoseb, dinoterb, diphenamid, dipropetryn, diquat, disul, dithiopyr, diuron, DMPA, DNOC, DSMA, EBEP, eglinazine, endothal, epronaz, EPTC, erbon, esprocarb, ethalfluralin, ethametsulfuron, ethidimuron, ethiolate, ethofumesate, ethoxyfen, ethoxysulfuron, etinofen, etnipromid, etobenzanid, EXD, fenasulam, fenoprop, fenoxaprop, fenoxaprop-P, fenoxasulfone, fenteracol, fenthiaprop, fentrazamide, fenuron, ferrous sulfate, flamprop, flamprop-M, flazasulfuron, florasulam, fluazifop, fluazifop-P, fluazolate, flucarbazone, flucetosulfuron, fluchloralin, flufenacet, flufenican, flufenpyr, flumetsulam, flumezin, flumiclorac, flumioxazin, flumipropyn, fluometuron, fluorodifen, fluoroglycofen, fluoromidine, fluoronitrofen, fluothiuron, flupoxam, flupropacil, flupropanate, flupyrsulfuron, fluridone, fluorochloridone, fluoroxypyr, flurtamone, fluthiacet, fomesafen, foramsulfuron, fosamine, furyloxyfen, glufosinate, glufosinate-P, glyphosate, halosafen, halosulfuron, haloxydine, haloxyfop, haloxyfop-P, hexachloroacetone, hexaflurate, hexazinone, imazamethabenz, imazamox, imazapic, imazapyr, imazaquin, imazethapyr, imazosulfuron, indanofan, indaziflam, iodobonil, iodomethane, iodosulfuron, ioxynil, ipazine, ipfencarbazone, iprymidam, isocarbam id, isocil, isomethiozin, isonoruron, isopolinate, isopropalin, isoproturon, isouron, isoxaben, isoxachlortole, isoxaflutole, isoxapyrifop, karbutilate, ketospiradox, lactofen, lenacil, linuron, MAA, MAMA, MCPA, MCPA-thioethyl, MCPB, mecoprop, mecoprop-P, medinoterb, mefenacet, mefluidide, mesoprazine, mesosulfuron, mesotrione, metam, metamifop, metamitron, metazachlor, metazosulfuron, metflurazon, methabenzthiazuron, methalpropalin, methazole, methiobencarb, methiozolin, methiuron, methometon, methoprotryne, methyl bromide, methyl isothiocyanate, methyldymron, metobenzuron, metobromuron, metolachlor, metosulam, metoxuron, metribuzin, metsulfuron, molinate, monalide, monisouron, monochloroacetic acid, monolinuron, monuron, morfamquat, MSMA, naproanilide, napropamide, naptalam, neburon, nicosulfuron, nipyraclofen, nitralin, nitrofen, nitrofluorfen, norflurazon, noruron, OCH, orbencarb, orthodichlorobenzene, orthosulfamuron, oryzalin, oxadiargyl, oxadiazon, oxapyrazon, oxasulfuron, oxaziclomefone, oxyfluorfen, parafluoron, paraquat, pebulate, pelargonic acid, pendimethalin, penoxsulam, pentachlorophenol, pentanochlor, pentoxazone, perfluidone, pethoxamid, phenisopham, phenmedipham, phenmedipham-ethyl, phenobenzuron, phenylmercury acetate, picloram, picolinafen, pinoxaden, piperophos, potassium arsenite, potassium azide, potassium cyanate, pretilachlor, prim isulfuron, procyazine, prodiamine, profluazol, profluralin, profoxydim, proglinazine, prometon, prometryn, propachlor, propanil, propaquizafop, propazine, propham, propisochlor, propoxycarbazone, propyrisulfuron, propyzamide, prosulfalin, prosulfocarb, prosulfuron, proxan, prynachlor, pydanon, pyraclonil, pyraflufen, pyrasulfotole, pyrazolynate, pyrazosulfuron, pyrazoxyfen, pyribenzoxim, pyributicarb, pyriclor, pyridafol, pyridate, pyriftalid, pyriminobac, pyrimisulfan, pyrithiobac, pyroxasulfone, pyroxsulam, quinclorac, quinmerac, quinoclamine, quinonamid, quizalofop, quizalofop-P, rhodethanil, rimsulfuron, saflufenacil, S-metolachlor, sebuthylazine, secbumeton, sethoxydim, siduron, simazine, simeton, simetryn, SMA, sodium arsenite, sodium azide, sodium chlorate, sulcotrione, sulfallate, sulfentrazone, sulfometuron, sulfosulfuron, sulfuric acid, sulglycapin, swep, TCA, tebutam, tebuthiuron, tefuryltrione, tembotrione, tepraloxydim, terbacil, terbucarb, terbuchlor, terbumeton, terbuthylazine, terbutryn, tetrafluoron, thenylchlor, thiazafluoron, thiazopyr, thidiazim in, thidiazuron, thiencarbazone-methyl, thifensulfuron, thiobencarb, tiocarbazil, tioclorim, topramezone, tralkoxydim, tri-allate, triasulfuron, triaziflam, tribenuron, tricamba, triclopyr, tridiphane, trietazine, trifloxysulfuron, trifluralin, triflusulfuron, trifop, trifopsime, trihydroxytriazine, trimeturon, tripropindan, tritac tritosulfuron, vernolate, xylachlor and mixtures thereof.

"Safener" means an active ingredient applied with herbicides to protect crops against their injury. Some of the safeners that can be employed in the present disclosure include, but are not limited to, benoxacor, benthiocarb, brassinolide, cloquintocet (mexyl), cyometrinil, daimuron, dichlormid, dicyclonon, dimepiperate, disulfoton, fenchlorazole-ethyl, fenclorim, flurazole, fluxofenim, furilazole, isoxadifen-ethyl, mefenpyr-diethyl, MG 191, MON 4660, naphthalic anhydride (NA), oxabetrinil, R29148, N-phenylsulfonylbenzoic acid amides and mixtures thereof.

"Nematicide" means an active ingredient having an effect on, such as reduction in the damage caused by, an agricultural-related nematode. Examples of nematicides which may be used in the present disclosure include, but are not limited to, an avermectin (for e.g., abamectin), carbamate nematicides (for e.g., aldicarb, thiadicarb, carbofuran, carbosulfan, oxamyl, aldoxycarb, ethoprop, methomyl, benomyl, alanycarb), organophosphorus nematicides (for e.g., phenamiphos (fenamiphos), fensulfothion, terbufos, fosthiazate, dimethoate, phosphocarb, dichlofenthion, isamidofos, fosthietan, isazofos ethoprophos, cadusafos, terbufos, chlorpyrifos, dichlofenthion, heterophos, isamidofos, mecarphon, phorate, thionazin, triazophos, diamidafos, fosthietan, phosphamidon, captan and mixtures thereof.

"Plant growth regulator" means an active ingredient used to influence the growth characteristics of plants. Examples of plant growth regulators which may be used in the present disclosure include, but are not limited to, 1-naphthaleneacetic acid, 1-naphthaleneacetic acid K-salt, 1-napthol, 2,4-dichlorophenoxyacetic acid (2,4-D), 2,4-DB, 2,4-DEP, 2,3,5-triiodobenzoic acid, 2,4,5-trichlorophenoxyacetic acid, 2-naphthoxyacetic acid, 2-naphthoxyacetic acid sodium salt, 3-chloro-4-hydroxyphenylacetic acid, 3-indoleacetic acid, 4-biphenylacetic acid, 4-chlorophenoxyacetic acid (4-CPA), 4-hydroxyphenylacetic acid, 6-benzylaminopurine, Auxindole, α-naphthaleneacetic acid K-salt, β-naphthoxyacetic acid, p-chlorophenoxyacetic acid, dicamba, dichlorprop, fenoprop, indole-3-acetic acid (IAA), indole-3-acetyl-DL-aspartic acid, indole-3-acetyl-DL-tryptophan, indole-3-acetyl-L-alanine, indole-3-acetyl-L-valine, indole-3-butyric acid (IBA), ndole-3-butyric acid K-salt, indole-3-propionic acid; α-naphthaleneacetic acid, methyl indole-3-acetate, naphthaleneacetamide, naphthaleneacetic acid (NAA), phenylacetic acid, picloram, potassium naphthenate, sodium naphthenate, 4-hydroxyphenethyl alcohol, 4-CPPU, 6-benzylaminopurine (BA), 6-(Y,Y-dimethylallylamino)purine (2iP), 2-iP-2HCl, adenine, adenine hem isulfate, benzyladenine, kinetin, meta-topolin, N6-benzoyladenine, N-benzyl-9-(2-tetrahydropyranyl) adenine (BP A), N-(2-chloro-4-pyridyl)-N-phenylurea, gibberellic acid $(GA_3)$, gibberellins, gibberellins A4+A7 $(GA_{4/7})$, ethylene and abscisic acid.

The term "target substrate" refers to a site underlying plant foliage which is the intended destination for the pesticide including, but not limited to, natural ground surfaces such as soil, water (e.g. lakes, ponds, marshes, swamps, streams, puddles, etc.) and artificial surfaces (e.g. pavement), a pest, or a combination thereof.

A "pest" generally includes an insect, mite, tick and other arthropods, a disease agent such as fungi, protozoa, bacteria and viruses, helminths, nematodes (roundworms), cestodes (tapeworms), platyhelminths (flatworms), trematodes (flukes) and other worms, sporozoan parasites, slugs and snails, and vertebrates such as birds, rodents or other vertebrates which can directly or indirectly injure or cause disease or damage in any plant or part thereof or any processed, manufactured or other product of the plant.

A "pesticidally effective amount" refers to that amount of a pesticide which, upon application, either reduces the presence of pests, or enhances a plant's resistance to a pest.

According to one aspect, the present disclosure is directed to a vegetable oil-based alkoxylate composition comprising a mixture of monoacyl alkoxylated glyceride having a formula (I), a diacyl alkoxylated glyceride having a formula (II), a triacyl alkoxylated glyceride having a formula (III), and an alkoxylated glycerin having a formula (IV):

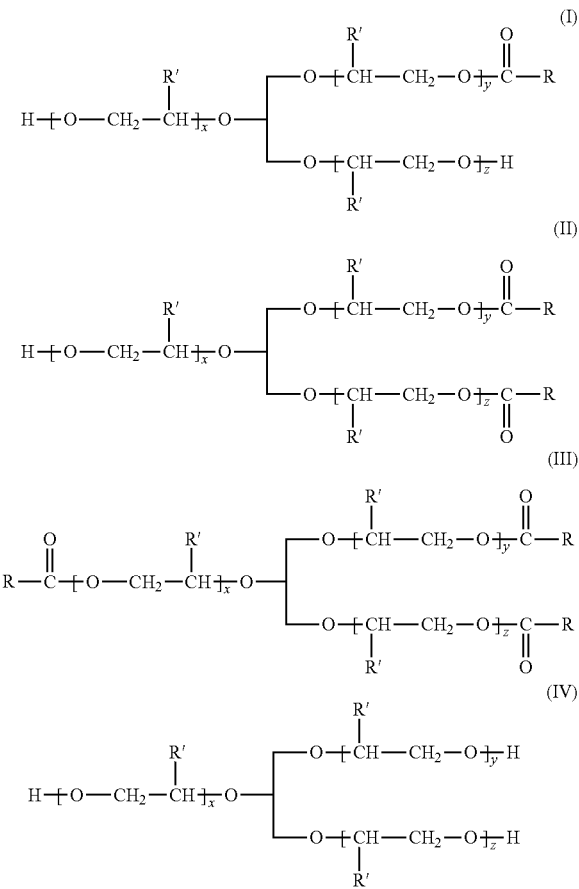

wherein R is a $C_8$ to $C_{24}$ saturated or unsaturated alkyl group; R' is H, $CH_3$, $CH_2CH_3$, or a combination thereof; and x, y, and z each range from 2 to 100 and the sum of x, y, and z for each of Formulas I, II, III, and IV is from 6 to 300.

In one embodiment, R is a $C_{16}$ to $C_{18}$ saturated or unsaturated alkyl group. In another embodiment, R' is hydrogen. In a preferred aspect, R is a $C_{16}$ to $C_{18}$ saturated or unsaturated alkyl group and R' is hydrogen.

In another embodiment, each of x, y, and z for Formulas I, II, III, and IV independently range from 2 to 75, or from 2 to 50, or from 2 to 25, or from 2 to 10, or from 2 to 5.

The sum of x, y, and z for each of Formulas I, II, III, and IV can also be in a range of from 6 to 275, or from 6 to 250, or from 6 to 225, or from 6 to 200, or from 6 to 175, or from 6 to 150, or from 6 to 125, or from 7 to 100, or from 7 to 90, or from 7 to 80, or from 7 to 70, or from 7 to 60, or from 7 to 50, or from 8 to 50, or from 8 to 45, or from 8 to 40, or from 9 to 40, or from 9 to 30, or from 5 to 30, or from 5 to 25, or from 5 to 15, or from 5 to 10, or from 10 to 25, or from 10 to 15, or from 11 to 15, or 12 to 15, or 13 to 15. In a preferred embodiment, the sum of x, y, and z for each of Formulas I, II, III, and IV is in a range of from 10 to 25.

In yet another embodiment, R' is hydrogen and the sum of x, y, and z is in a range of from 10 to 25 for each of Formulas I, II, III, and IV.

It should be noted that the "sum of x, y, and z," as used with respect to Formulas I to IV, can also be referred to as the number of moles of alkoxylation. For instance, an ethoxylated glycerin having 10 moles of ethoxylation can be represented by Formula IV, wherein R' is hydrogen and the sum of x, y, and z is 10. A person of ordinary skill in the art will understand that x, y, and z do not necessarily have to be equal.

The weight ratio of (a) the total amount of the mono-, di-, and triacyl alkoxylated glycerides having Formulas I, II, and III to (b) the amount of alkoxylated glycerin having Formula IV in the vegetable oil-based alkoxylate composition can be in a range of from 0.5:1 to 30:1, or from 0.5:1 to 27:1, or from 0.5:1 to 25:1, or from 0.5:1 to 20:1, or from 0.5:1 to 15:1, or from 0.5:1 to 10:1, or from 0.5:1 to 5:1, or from 0.5:1 to 4.5:1, or from 0.5:1 to 4:1. The aforementioned ranges include integers and fractions therebetween such as, for example, a range of from 3:1 to 4:1, or from 3.5:1 to 4:1, or from 5:1 to 7:1, or from 5.2:1 to 6.8:1.

In one particular embodiment, the weight ratio of (a) the total amount of the mono-, di-, and triacyl alkoxylated glycerides having Formulas I, II, and III to (b) the amount of alkoxylated glycerin having Formula IV in the vegetable oil-based alkoxylate composition is in a range of from 3:1 to 4:1, or from 3:1 to 3.5:1, or from 3.1:1 to 3.5:1, or from 3.2:1 to 3.5:1, or from 3.3:1 to 3.5:1, or from 3.4:1 to 3.5:1.

It has been found that the ratio of the mixture of vegetable oil alkoxylates to the alkoxylated glycerin can have a synergistic effect.

The vegetable oil-based alkoxylate composition can have a hydroxyl value less than 500, or less than 400, or less than 350. In one embodiment, the vegetable oil-based alkoxylate composition has a hydroxyl value in a range of from 75 to 350, or from 75 to 300, or from 75 to 275, or from 75 to 250, or from 75 to 225, or from 75 to 200.

The weight percent for each compound having Formulas I, II, III, and IV in the composition can vary as long as the weight ratio of (a) the total amount of mono-, di-, and triacyl alkoxylated glycerides having Formulas I, II, and III to (b) the amount of alkoxylated glycerin Formula IV is consistent with the weight ratio(s) previously described herein.

In another aspect, the present disclosure is directed to a method of producing the vegetable oil-based alkoxylate composition via a transesterification reaction. The method comprises reacting a base catalyst, a vegetable oil, and an alkoxylated glycerin to produce the vegetable oil-based alkoxylate composition, wherein the alkoxylated glycerin is represented by Formula IV (as previously described herein):

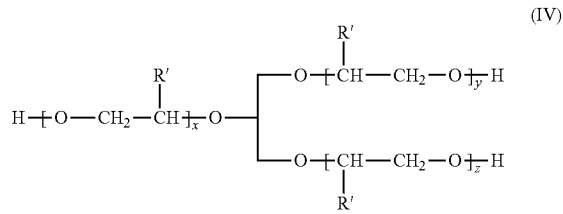

wherein R' is H, $CH_3$, $CH_2CH_3$, or combinations thereof; and x, y, and z are each in a range of from 2 to 100 and the sum of x, y, and z is in a range of from 6 to 300.

A representative illustration of the method of producing the vegetable oil-based alkoxylate composition is shown in FIG. 1.

In one embodiment, R in Formula IV is a $C_{16}$ to $C_{18}$ saturated or unsaturated alkyl group. In another embodiment, R' in Formula IV is hydrogen. In yet another embodiment, R in Formula IV is a $C_{16}$ to $C_{18}$ saturated or unsaturated alkyl group and R' is hydrogen.

In another embodiment, x, y, and z in Formula IV each range from 2 to 75, or from 2 to 50, or from 2 to 25, or from 2 to 10, or from 2 to 5.

The sum of x, y, and z in Formula IV can also range from 6 to 275, or from 6 to 250, or from 6 to 225, or from 6 to 200, or from 6 to175, or from 6 to 150, or from 6 to 125, or from 7 to 100, or from 7 to 90, or from 7 to 80, or from 7 to 70, or from 7 to 60, or from 7 to 50, or from 8 to 50, or from 8 to 45, or from 8 to 40, or from 9 to 40, or from 9 to 30, or from 5 to 30, or from 5 to 25, or from 5 to 15, or from 5 to 10, or from 10 to 25, or from 10 to 15, or from 11 to 15, or 12 to 15, or 13 to 15. In a preferred embodiment, the sum of x, y, and z in Formula IV is in a range of from 10 to 25.

The step of reacting the base catalyst, vegetable oil, and alkoxylated glycerin can comprise heating the mixture at a temperature in a range of from about 80° C. to about 120° C., or from about 85° C. to about 115° C., or from about 90° C. to about 110° C., or from about 95° C. to about 105° C., or at about 100° C. for a time sufficient to produce the vegetable oil-based alkoxylate composition.

The time period for heating the base catalyst, vegetable oil, and alkoxylated glycerin can range from 45 minutes to 120 minutes, or from 45 minutes to 90 minutes, or from 45 minutes to 75 minutes, or from 50 minutes to 70 minutes, or from 55 minutes to 65 minutes, or for about 60 minutes.

The base catalyst comprises a strong base having a pH greater than 9, or from 9 to 13, or 10 to 13. In one embodiment, the base catalyst comprises a strong base selected from potassium hydroxide, sodium hydroxide, ammonium hydroxide, sodium methoxide, potassium methoxide, or combinations thereof. In one particular embodiment, the base catalyst is potassium hydroxide. One non-limiting example of the base catalyst is a 45 wt. % potassium hydroxide solution commercially available from Ashta Chemicals (Ashtabula, Ohio).

The base catalyst can be removed from the vegetable oil-based alkoxylate composition using, for example, one or more additional processing steps, rendering the composition substantially free of the base catalyst. Alternatively, the base catalyst can be allowed to remain in the vegetable oil-based alkoxylate composition.

The vegetable oil used to produce the presently disclosed vegetable oil-based alkoxylate composition can be any vegetable oil. Suitable oils include algae oil, avocado oil, cocoa butter, cocoa butter substitutes, canola oil, castor oil, coconut oil, coriander oil, corn oil, cottonseed oil, grapeseed oil, hazelnut oil, hemp or hempseed oil, illipe fat, linseed oil, mango kernel oil, olive oil, palm oil, palm kernel oil, peanut oil, rapeseed oil, rice bran oil, safflower oil, shea fat, soybean oil, sunflower oil, or combinations thereof. The oil can be (or have been) subjected to one or more refining steps including degumming, bleaching, deodorising and/or interesterification, such as by chemical or enzymatic treatment, prior to the method of the invention. The oil can additionally undergo (or have undergone) other treatment steps such as fractionation, prior to the presently disclosed method.

The algae oil can be obtained from either a natural algae or a genetically modified strain of algae such as high lauric algae, high oleic algae, high capric algae, or combinations thereof.

In one particular embodiment, the vegetable oil is selected from algae oil, avocado oil, castor oil, coconut oil, grapeseed oil, hemp oil, palm oil, palm kernel oil, rapeseed oil, rice bran oil, soybean oil, or combinations thereof. In a preferred aspect, the vegetable oil is selected from algae oil, avocado oil, soybean oil, or combinations thereof.

In yet another aspect, the present disclosure is directed to a method of producing a vegetable oil-based alkoxylate composition via a transesterification reaction, wherein the method comprises: (i) combining a base catalyst, a vegetable oil, and an alkoxylated glycerin to form a reactant mixture, wherein the alkoxylated glycerin is represented by Formula IV (as previously described herein):

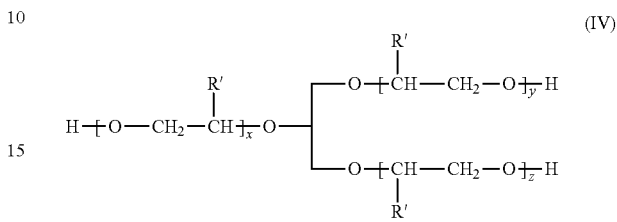

wherein R' is H, $CH_3$, $CH_2CH_3$, or combinations thereof; and x, y, and z are each in a range of from 2 to 100 and the sum of x, y, and z is in a range of from 6 to 300; and (ii) heating the reactant mixture at a temperature in a range of from 80° C. to 120° C. for a time sufficient to produce the vegetable oil-based alkoxylate composition.

In one embodiment, the vegetable oil and alkoxylated glycerin are present in the reactant mixture in an amount such that the vegetable oil-based alkoxylate composition comprises a weight ratio of (a) mono-, di-, and triacyl alkoxylated glycerides (represented by Formulas I, II, III above) to (b) alkoxylated glycerin (represented by Formula IV above) as previously described herein.

In one aspect, the vegetable oil is present in the reaction mixture in an amount ranging from about 10 to about 50 wt. %, or from about 10 to about 45 wt. %, or from about 15 to about 40 wt. %, or from about 20 to about 35 wt. %, or from about 25 to about 35 wt. %, or from about 28 to about 32 wt. %, or is about 30 wt. %, and the alkoxylated glycerin is present in the reactant mixture in an amount ranging from about 50 to about 95 wt. %, or from about 55 to about 90 wt. %, or from about 60 to about 85 wt. %, or from about 65 to about 80 wt. %, or from about 65 to about 75 wt. %, or from about 68 to about 72 wt. %, or is about 70 wt. % based on the weight of the vegetable oil and alkoxylated glycerin.

In one embodiment, the vegetable oil comprises coconut oil, algae oil, or soybean oil and is present in the reactant mixture in a range of between 25 and 35 wt. % based on the weight of the vegetable oil and the alkoxylated glycerin, and the alkoxylated glycerin is present in the reactant mixture in a range of between 65 and 75 wt. % based on the weight of the vegetable oil and alkoxylated glycerin.

In another embodiment, the vegetable oil comprises coconut oil, algae oil, or soybean oil and is present in the reactant mixture in a range between about 26 to about 34 wt. %, or about 27 to about 33 wt. %, or about 28 to about 32 wt. %, or about 29 to about 31 wt. %, or at about 30 wt. % based on the weight of the vegetable oil and alkoxylated glycerin, and the alkoxylated glycerin is present in the reactant mixture in a range of between about 66 and 74 wt. %, or about 67 and 73 wt. %, or about 68 and about 72 wt. %, or about 69 and 71 wt. %, or at about 70 wt. % based on the weight of the vegetable oil and alkoxylated glycerin.

Figure 2:
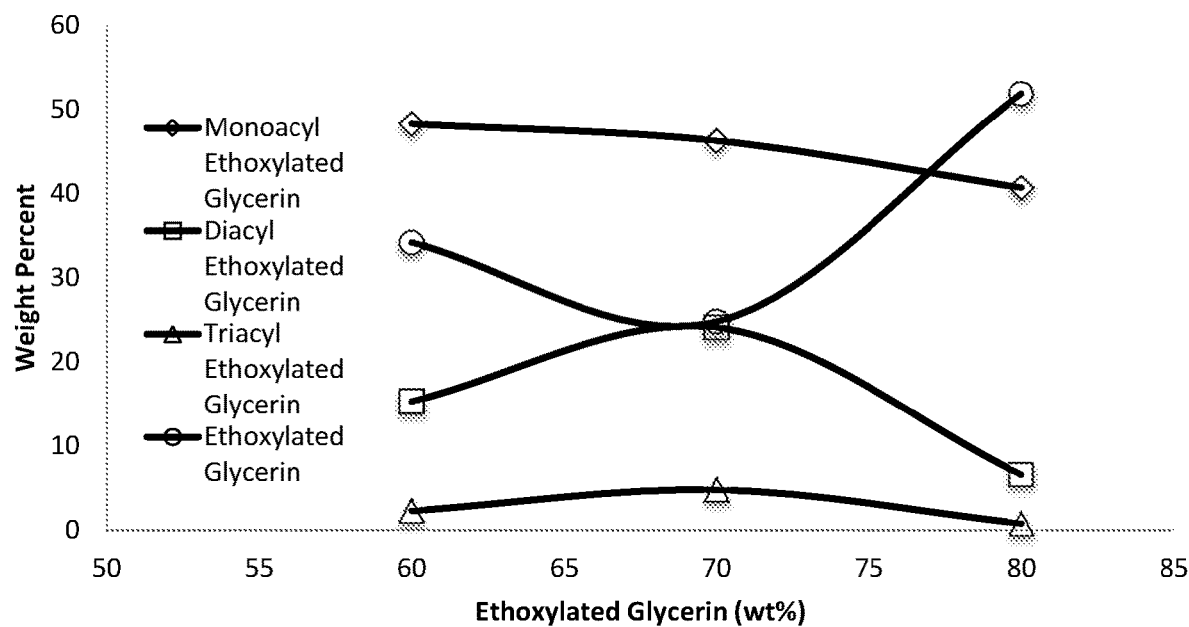
FIG. 2 is a graphical representation of a distribution of mono-, di-, and triacyl alkoxylated glycerides and unreacted alkoxylated glyceride for a coconut oil-based ethoxylate composition produced using varying amounts of (i) coconut oil and (ii) ethoxylated glycerin having 5 moles ethoxylation.

To demonstrate the ability to control the distribution of alkoxylated glycerin and mono-, di-, and triacyl alkoxylated glycerides in a composition, coconut oil and ethoxylated glycerin with 10 moles of ethoxylation were reacted at various ratios to produce a plot of the weight percent of each species versus the amount of ethoxylated glycerin used. The distribution is presented in FIG. 2. As illustrated by FIG. 2, the amount of vegetable oil (e.g., coconut oil) and alkoxylated glycerin (e.g., ethoxylated glycerin) can be varied in the presently disclosed method so as to consistently produce a vegetable oil-based alkoxylate composition having a particular weight ratio such as, for example, 3:1 to 4:1 vegetable oil alkoxylates to alkoxylated glycerin. The amount of coconut oil reacted with the ethoxylated glycerin for a particular point in FIG. 2 can be determined by subtracting the amount of ethoxylated glycerin from 100.

Figure 3:
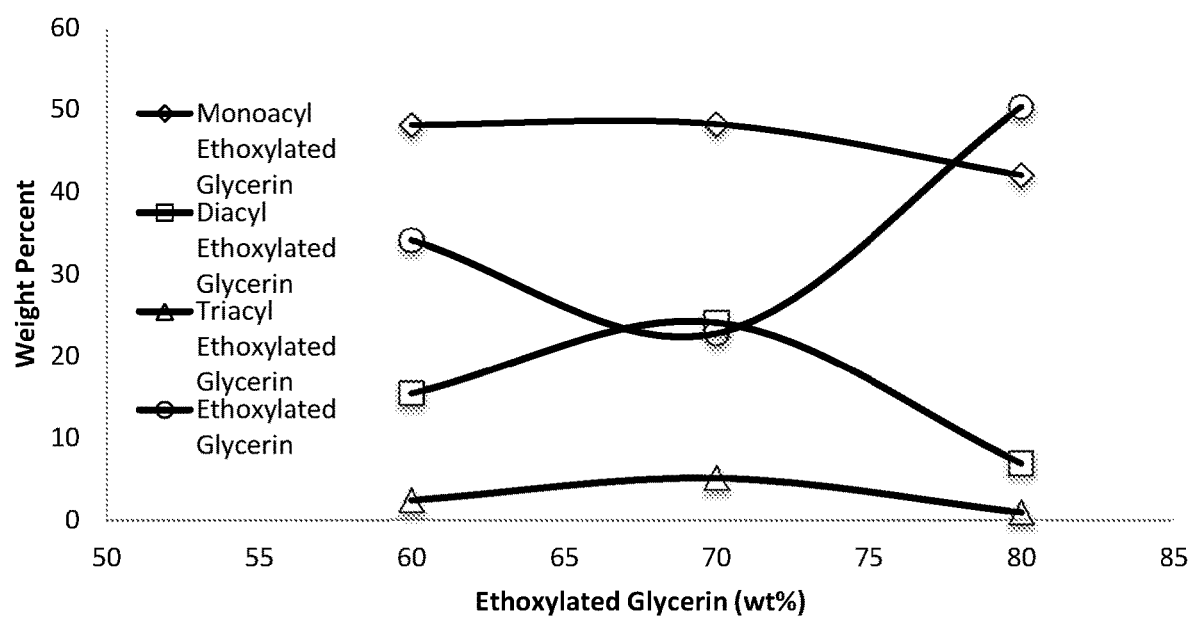
FIG. 3 is a graphical representation of a distribution of mono-, di-, and triacyl alkoxylated glycerides and unreacted alkoxylated glycerin for a high lauric algae oil-based ethoxylate composition produced using varying amounts of (i) high lauric algae oil and (ii) ethoxylated glycerin having 5 moles ethoxylation.

To further demonstrate the ability to control the distribution of alkoxylated glycerin and mono-, di-, and triacyl alkoxylated glycerides in a composition, high lauric algae oil and ethoxylated glycerin with 5 moles ethoxylation were reacted at various ratios to produce a plot of the weight percent of each species versus the amount of ethoxylated glycerin used. The distribution is presented in FIG. 3. Similar to FIG. 2 for coconut oil, the plot in FIG. 3 demonstrates that the amount of vegetable oil (e.g., algae oil) and alkoxylated glycerin (e.g., ethoxylated glycerin) can be varied in the presently disclosed method so as to consistently produce a vegetable oil alkoxylate composition having a particular weight ratio of mono-, di, and triacyl alkoxylated glycerides to alkoxylated glycerin. The amount of algae oil reacted with the ethoxylated glycerin for a particular point in FIG. 3 can be determined by subtracting the amount of ethoxylated glycerin from 100.

The method of producing a vegetable oil-based alkoxylate composition can further comprise adding a neutralization agent after the reacting (i.e., heating) step. The neutralization agent can comprise hydrogen peroxide, acetic acid, citric acid, or combinations thereof. In one embodiment, the neutralization agent is selected from the group consisting of hydrogen peroxide, acetic acid, citric acid, and combinations thereof.

In one embodiment, the method of producing the composition comprises adding hydrogen peroxide after the reacting (i.e., heating) step.

The composition produced by the presently disclosed method has been found to have a relatively light color and low amounts of unreacted alkoxylates and 1,4-dioxane as compared to compositions produced by direct alkoxylation methods known in the art.

In one aspect, the method of producing the vegetable oil-based alkoxylate composition can further comprise a step whereby the vegetable oil-based alkoxylate composition is mixed with additional alkoxylated glycerin having Formula IV so as to achieve a specific weight ratio of (a) mono-, di-, and triacyl alkoxylated glycerides to (b) alkoxylated glycerin as previously described herein.

In another aspect, the method of producing the vegetable oil-based alkoxylate composition can further comprise a step whereby the alkoxylated glycerin is produced and then combined with the base catalyst and vegetable oil.

The alkoxylated glycerin can be produced by a method comprising (i) combining glycerin and an alkylene oxide, wherein the alkylene oxide is selected from the group consisting of ethylene oxide, propylene oxide, butylene oxide, and combinations thereof, and (ii) heating the combination of glycerin and alkylene oxide at a temperature in a range of from about 120° C. to about 170° C., or from about 120° C. to about 160° C., or from about 150° C. to about 165° C., or from about 150° C. to about 160° C., or from about 155° C. to 165° C., or between 140° C. and 160° C. It is to be understood that a person of ordinary skill in the art is fully capable of determining the amount of time to heat the combination of glycerin and alkylene oxide based on (i) the targeted amount of alkoxylation and (ii) the specific heating conditions.

In another aspect, the present disclosure is directed to a cement mortar composition comprising cement and the vegetable oil-based alkoxylate composition disclosed herein.

Non-limiting examples of the cement include a pozzolan powder, Portland cement, slag cements, other types of conventional cements, or combinations thereof. Non-limiting examples of the pozzolan powder include Class C fly-ash, Class F fly-ash, Class N pozzolanic ash, and combinations thereof.

The cement mortar composition can further comprise at least one of an aggregate material, a thickening agent, anti-sag agents, air entraining agents, wetting agents, defoamers, superplasticizers, dispersants, calcium-complexing agents, retarders, accelerators, water repellants, redispersible powders, biopolymers, fibres, freeze-thaw regulators, corrosion inhibitors, strength enhancers, cement grinding aids, and water.

The cement mortar composition can also comprise one or more fillers in addition to the cement. Non-limiting examples of the one or more fillers include silica sand, natural sand, manufactured fine aggregate from stone production, bottom ash, slag, ground glass, recycled foundry sand, and combinations thereof.

Yet another aspect of the present disclosure is directed to a pigment dispersion, comprising a pigment, a solvent, and the vegetable oil-based alkoxylate composition as disclosed herein.

The pigment can be an inorganic pigment, organic pigment, or combinations thereof.

Non-limiting examples of the inorganic pigments include titanium oxide, iron oxide, calcium oxide, barium sulfate, aluminum hydroxide, barium yellow, cadmium red, chrome yellow, and carbon black manufactured by known methods such as contact methods, furnace methods, and thermal methods.

Non-limiting examples of the organic pigments include azo pigments (azo lakes, insoluble azo pigments, condensed azo pigments, chelate az pigments, etc.), polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinofuranone pigments, etc.), dye chelates (basic dye type chelates, acid dye type chelates), nitro pigments, nitroso pigments, and aniline black.

In one embodiment, the pigment comprises one or more black pigments including, for example but without limitation, (i) carbon black (C.I. Pigment Black 7) such as furnace black, lamp black, acetylene black, and channel black, (ii) metals such as copper and iron (C.I. Pigment Black 11), (iii) metal compounds such as titanium oxide, and (iv) organic pigments such as aniline black (C.I. Pigment Black 1).

In another embodiment, the pigment comprises one or more pigments for colors other than black. Non-limiting examples of colored pigments include C.I. Pigment Yellow 1, 3, 12, 13, 14, 17, 24, 34, 35, 37, 42 (yellow titanium oxide), 53, 55, 74, 81, 83, 95, 97, 98, 100, 101, 104, 108, 109, 110, 117, 120, 128, 138, 150, 151, 153, and 183, C.I. Pigment Orange 5, 13, 17, 36, 43, and 51, C.I. Pigment Red 1, 2, 3, 5, 17, 22, 23, 31, 38, 48:2, 48:2 {Permanent Red 2B (Ca)}, 48:3, 48:4, 49:1, 52:2, 53:1, 57:1 (Brilliant Carmine 6B), 60:1. 63:1, 63:2, 64:1, 81, 83, 88, 101 (colcothar), 104, 105, 106, 108 (cadmium red), 112, 114, 122 (quinacridone magenta), 123, 146, 149, 166, 168, 170, 172, 177, 178, 179, 185, 190, 193, 209, 219 and 254, C.I. Pigment Violet (Rhodamine Lake), 3, 5:1, 16, 19, 23, and 38, C.I. Pigment Blue 1, 2, 15, 15:1, 15:2, 15:3, (phthalocyanine blue), 15:4, 16, 17:1, 56, 60, 63, and C.I. Pigment Green 1, 4, 7, 8, 10, 17, 18, and 36.

The solvent comprises water and/or organic solvents. Non-limiting organic solvents include, but are not limited to, xylene, toluene, alcohols (e.g., methanol, ethanol, n-propanol, iso-propanol, n-butanol, sec-butyl alcohol, tert-butyl alcohol, iso-butyl alcohol, furfuryl alcohol and tetrahydrofurfuryl alcohol), ketones or ketoalcohols (e.g., acetone, methyl ethyl ketone and diacetone alcohol), ethers (e.g., dimethyl ether and methyl ethyl ether), cyclic ethers (e.g., tetrahydrofuran and dioxane), esters (e.g., ethyl acetate, ethyl lactate, ethylene carbonate and propylene carbonate), polyhydric alcohols (e.g., ethylene glycol, diethylene glycol, triethylene glycol, propylene glycol, tetraethylene glycol, polyethylene glycol, glycerol, 2-methyl-2,4-pentanediol and 1,2,6-hexantriol), hydroxy functional ethers of alkylene glycols (e.g., butyl 2-hydroxyethyl ether, hexyl 2-hydroxyethyl ether, methyl 2-hydroxypropyl ether and phenyl 2-hydroxypropyl ether), nitrogen containing cyclic compounds (e.g., pyrrolidone, N-methyl-2-pyrrolidone and 1, 3-dimethyl-2-imidazolidinone), and sulfur containing compounds (e.g. thioglycol, dimethyl sulfoxide and tetramethylene sulfone).

In one embodiment, the vegetable oil-based alkoxylate composition is present in the pigment dispersion at a weight ratio of from about 0.001:50 to about 1:50, or from about 0.01:50 to 1:20, or from about 0.1:50 to about 1:1 of the vegetable oil-based alkoxylate composition actives to pigment.

The pigment dispersion can further comprise one or more additives. Non-limiting examples of the one or more additives include a foaming agent, anti-foaming agent, defoamer, pH regulator, rheology modifier, freeze-thaw regulator, thixotropes, antisettling agent, dispersant, wetting agent, corrosion inhibitor, light stabilizer, heat stabilizer, adhesion promoter, anti-oxidant, biocide, leveling agent, antiblocking agent, resin, wax, coalescing agent, emulsifier surfactants, or combinations thereof.

Another aspect of the present disclosure is directed to a detergent composition containing the presently disclosed vegetable oil-based alkoxylate composition.

Conventional components of detergent compositions include, but are not limited to, surfactants, bleaches and bleach activators, enzymes and enzyme stabilizing agents, suds boosters or suds suppressers, anti-tarnish and anticorrosion agents, non-builder alkalinity sources, chelating agents, organic and inorganic fillers, solvents, hydrotropes, optical brighteners, dyes, perfumes, and modified cellulose ether fabric treatment agents. The fabric care agents or delivery enhancing agent of the present invention may be a component of or added to a detergent composition or a fabric conditioner. The detergent composition may be in the form of a granule, liquid, or tablet. Detergent compositions of the present disclosure may be made in accordance with U.S. Pat. Nos. 6,274,540 and 6,306,817, which are incorporated by reference herein in its entirety.

In one embodiment, the detergent composition comprises the vegetable oil-based alkoxylate composition as disclosed herein and at least one of a surface active agent, an enzyme, an enzyme stabilizer, a hydrotrope, a rheology modifier, an anti-redeposition polymer, an optical brightener, a preservative, a dye, and a fragrance.

The surface active agent comprises, for example but without limitation, one or more of an anionic surfactant, cationic surfactant, amphoteric surfactant, non-ionic surfactant, or combinations thereof.

The enzyme can be any suitable enzymes including, for example but without limitation: hemicellulases, peroxidases, proteases, cellulases, xylanases, lipases, phospholipases, esterases, cutinases, pectinases, keratanases, reductases, oxidases, phenoloxidases, lipoxygenases, ligninases, pullulanases, tannases, pentosanases, malanases, β-glucanases, arabinosidases, hyaluronidase, chondroitinase, laccase, and known amylases, and combinations thereof. Other types of enzymes may also be included. They may be of any suitable origin, such as vegetable, animal, bacterial, fungal and yeast origin. However, their choice is governed by several factors such as pH-activity and/or stability optima, thermostability, stability versus active detergents, builders and so on. In some embodiments, the enzyme combination comprises a cocktail of conventional detersive enzymes like protease, lipase, cutinase and/or cellulase in conjunction with amylase. Detersive enzymes are described in greater detail in U.S. Pat. No. 6,579,839, which is hereby incorporated by reference herein in its entirety. In some embodiments, the compositions herein contain from about 0.05% to about 2% by weight of detersive enzymes.

Additional enzymes, amounts thereof, and non-limiting examples of enzyme stabilizers are discussed in detail in U.S. Patent Application Publication No. 2008/0234165, which is hereby incorporated by reference herein in its entirety.

It is also envisioned that the presently disclosed vegetable oil-based alkoxylate composition can be used as an emulsifier in crop oil and/or as an emulsifier for blow agents in polyurethane production.

As such, in yet another aspect, the vegetable oil-based alkoxylate composition of the present disclosure is included in an agrochemical formulation for application onto a target substrate to elicit a chemical or biological effect. In such aspect, the agrochemical formulation comprises (i) a pesticidally effective amount of a pesticide or a mixture of pesticides and (ii) the vegetable oil-based alkoxylate composition as described herein. According to some aspects, the presently disclosed vegetable oil-based alkoxylate composition is present in the agrochemical formulation at a concentration such that the pesticidal efficacy of the agrochemical formulation is enhanced as compared to a reference agrochemical formulation devoid of the presently disclosed vegetable oil-based alkoxylate composition but otherwise having the same ingredients as the agrochemical formulation. By "enhanced" it is to be understood that the vegetable oil-based alkoxylate composition of the present disclosure increases the performance of the active ingredients in agrochemical formulations (for e.g., a higher activity of the active ingredients for a given application rate, a lower application rate with a given effect, better uptake of the active ingredient by the target substrate, and thus advantages for a pre-emergence or post-emergence treatment, in particular the spray treatment of target substrates) as compared to agrochemical formulations that do not contain the vegetable oil-based alkoxylate composition of the present disclosure.

In some aspects, the composition useful in agrochemical formulations may consist of the presently disclosed vegetable oil-based alkoxylate composition while in other aspects the composition may comprise the vegetable oil-based alkoxylate composition and an auxiliary component.

Examples of auxiliary components include, but are not limited to, a solvent, liquid carrier, solid carrier or filler, anionic surfactant (for e.g. alkali, alkaline earth or ammonium salts of sulfonates, sulfates, phosphates, carboxylates, and mixtures thereof), nonionic surfactant (for e.g. alkoxylates, N-substituted fatty acid amides, amine oxides, esters, sugar-based surfactants, polymeric surfactants, and mixtures thereof), cationic surfactant (for e.g. quaternary ammonium compounds with one or two hydrophobic groups, or salts of long-chain primary amines), dispersant, emulsifier, wetter, adjuvant, solubilizer, penetration enhancer, protective colloid, adhesion agent, thickener, humectant, repellent, attractant, feeding stimulant, compatibilizer, bactericide, anti-freezing agent, crystallization inhibitor, anti-foaming agent, colorant, tackifier, binder, preservative, inorganic or organic acid to neutralize the pH, clarifier, stabilizer, fertilizer such as ammonium sulfate, urea or compound fertilizer, such as phosphorus-, potash- and nitrogen-based compound fertilizers (for e.g. P,K,N fertilizers), UV stabilizer and mixtures thereof.

According to some aspects, the composition useful in agrochemical formulations may include (i) about 0.1-99.9% by weight of the vegetable oil-based alkoxylate composition disclosed herein and (ii) about 0.1-99.9% by weight of an auxiliary component, where the % by weight is based on the total weight of the composition. In another aspect, the composition may include (i) about 0.1-50% by weight of the vegetable oil-based alkoxylate composition disclosed herein and (ii) about 0.1-50% by weight of the auxiliary component, where the % by weight is based on the total weight of the composition. In yet a further aspect, the composition may include (i) about 0.1-29.9% by weight of the vegetable oil-based alkoxylate composition disclosed herein and (ii) about 70.1-99.9% by weight of an auxiliary component, where the % by weight is based on the total weight of the composition.

As described above, the composition comprising the vegetable oil-based alkoxylate composition of the present disclosure enhances the bioactivity of a pesticide, thus the composition is a composition wherein, when combined with a pesticide or mixture of pesticides to form an agrochemical formulation and applied to a target substrate, achieves at least 60%, 65%, 70%, 75%, 80%, or even at least 85%, or even at least 90% control. "% control," as used herein, refers to any observable measure of control of target substrate growth, which can include one or more of the actions of (1) killing, (2) inhibiting growth, reproduction or proliferation, and (3) removing, destroying, or otherwise diminishing the occurrence and activity of pests. Control can be measured by any of the various methods known in the art.

Accordingly, in another aspect, there is provided an agrochemical formulation comprising a pesticide and the vegetable oil-based alkoxylate composition of the present disclosure (and optional auxiliary component(s)). The agrochemical formulation may be used in treating target substrates, such as those disclosed above, and refers to all forms of compositions including concentrates and spray formulations. "Spray formulations" are aqueous agrochemical formulations including all the components which it is desired to apply to the target substrate or their environment in a form and at a concentration (dilution) appropriate for spraying. Spray formulations can be made up by simple dilution of concentrates containing desired components (other than water), or by mixing of the individual components, or a combination of diluting a concentrate and adding further individual components or mixtures of components. Typically such end use mixing is carried out in the spray tank from which the formulation is sprayed or a holding tank for filling the spray tank and commonly such mixing and mixtures are called tank mixing and tank mixtures. "Concentrates" are agrochemical formulations, which may be aqueous or non-aqueous, and which are designed to be diluted with water (or a water based liquid) to form the corresponding spray formulations and include such compositions in liquid form such as solutions, emulsions or dispersions and in solid form, especially in water dispersible solid form, such as granules or powders. "Emulsifiable concentrates" are liquid "concentrates" including the pesticide and the presently disclosed vegetable oil-based alkoxylate composition in solution or dispersion, usually also including an emulsifier and/or surfactant, which readily emulsify on dilution in water, typically with no more than gentle stirring.

The amount of pesticide included in the agrochemical formulation of the present disclosure will vary according to a number of parameters, such as the target substrate to be treated, the area to be treated, etc. In general, a rate of application from about five grams to about four kilograms per hectare (g/ha) of pesticide may be suitable. The amount of the vegetable oil-based alkoxylate composition of the present disclosure in the agrochemical formulation may be from about 0.01-99% by weight, based on the total weight of the agrochemical formulation.

The agrochemical formulations of the present disclosure may be used in conventional agricultural methods. For example, the pesticide or mixture of pesticides and the presently disclosed vegetable oil-based alkoxylate composition may be mixed with water and/or other solvent(s) and/or fertilizers and applied post-emergence to a desired target substrate by any means, such as airplane spray tanks, knapsack spray tanks, cattle dipping vats, farm equipment used in ground spraying (for e.g., boom sprayers, hand sprayers), and the like.

As discussed above, in accordance with some aspects, the agrochemical formulation can be a concentrate composition, which can be diluted in a suitable volume of water to form a spray formulation (for e.g., a tank mix composition) for applying to the target substrate. The concentrate composition can be in liquid, solid, or semi-solid form. In at least one aspect, it is an aqueous concentrate composition.

In one particular aspect, the amount of the pesticide in the concentrate composition can be from about 1% A by weight to about 80% by weight, alternatively from about 16% by weight to about 60% by weight, alternatively from 35% by weight to about 55% by weight, based on the total weight of the concentrate composition. The amount of the presently disclosed vegetable oil-based alkoxylate composition in the concentrate composition may be from about 0.0001% by weight to about 20% by weight, alternatively between from about 0.001% by weight to about 15% by weight, or alternatively from about 0.01% by weight to about 10% by weight percent, or alternatively from about 0.1% A by weight to about 5% by weight, or even alternatively from about 0.5% by weight to about 3% by weight, based on the total weight of the concentrate composition.

The concentrate composition can be diluted by a user with water to render a spray formulation containing from about 0.01% by weight to about 15% by weight, alternatively from about 0.1% by weight to about 5% by weight, alternatively from about 0.2% by weight to about 2% by weight of the pesticide, based on the total weight of the spray formulation. The spray formulation can typically contain from about 0.0001% by weight to about 3% by weight, alternatively from about 0.001% by weight to about 1% by weight, alternatively from about 0.01% by weight to about 0.5% by weight percent of the vegetable oil-based alkoxylate composition of the present disclosure.

In other aspects of the present disclosure, the pesticide and the presently disclosed vegetable oil-based alkoxylate composition are combined to form a "ready-to-use" (RTU) spray formulation. The RTU spray formulation can be prepared by a user by diluting a concentrate composition as described above, or alternatively can be provided to the user as is. For example, the RTU spray formulation can contain from about 0.5% by weight to about 5% by weight, alternatively from about 0.75% by weight to about 3% by weight, alternatively from about 1.5% by weight to about 2.5% by weight of the pesticide, based on the total weight of the RTU spray formulation. The RTU spray formulation can contain from about 0.01% by weight to about 2.5% by weight, alternatively from about 0.2% by weight to about 2% by weight, alternatively from about 0.5% by weight to about 1% by weight of the vegetable oil-based alkoxylate composition of the present disclosure. The balance of the RTU composition can be water.

In still yet another aspect, there is provided a method for killing or inhibiting or repelling a pest comprising the steps of providing an agrochemical formulation comprising (i) a pesticidally effective amount of a pesticide and (ii) the vegetable oil-based alkoxylate composition of the present disclosure and optional auxiliary component(s) and contacting the agrochemical formulation and the pest.

EXAMPLES

Examples are provided below. However, the present disclosure is to be understood to not be limited in its application to the specific experiments, results, and laboratory procedures disclosed herein below. Rather, the Examples are simply provided as one of various embodiments and are meant to be exemplary and not exhaustive.

From the above description, it is clear that the present disclosure is well adapted to carry out the object and to attain the advantages mentioned herein as well as those inherent in the present disclosure. While exemplary embodiments have been described for the purposes of the disclosure, it will be understood that numerous changes may be made which will readily suggest themselves to those skilled in the art which can be accomplished without departing from the scope of the present disclosure and the appended claims.

To demonstrate the presently disclosed vegetable oil-based alkoxylate compositions, several different examples were prepared using a variety of oils that were then analyzed to compare their properties to leading surfactants in the prior art, i.e., SURFONIC® L24-7 available from Huntsman Corporation or an affiliate thereof, or to a surfactant blend of sodium lauryl ether sulfate and cocamidopropyl betaine.

Algae Oil

Algae oil from three different variations of genetically engineered algae were used in the following examples: high capric algae oil, high lauric algae oil, and high oleic algae oil, each of which has a unique fatty acid distribution as set forth in Tables 1-3 below.

TABLE 1

High Capric Algae Oil

| Fatty Acid | Wt. % |
| --- | --- |
| C8:0 | 0.1 |
| C10:0 | 38.9 |
| C12:0 | 41 |
| C14:1 | 2.2 |
| C16:0 | 2.8 |

TABLE 1-continued

High Capric Algae Oil

| Fatty Acid | Wt. % |
| --- | --- |
| C18:0 | 0.7 |
| C18:1 | 11.3 |
| C18:2 | 2 |
| C18:3 | 0.2 |

TABLE 2

High Lauric Algae Oil

| Fatty Acid | Wt. % |
| --- | --- |
| C8:0 | 0.3 |
| C10:0 | 15.24 |
| C11:0 | 0.07 |
| C12:0 | 44.54 |
| C12:1 | 0.04 |
| C13:0 | 0.06 |
| C14:0 | 13.41 |
| C14:1 | 0.01 |
| C15:0 | 0.02 |
| C16:0 | 7.08 |
| C16:1 | 0.21 |
| C17:0 | 0.02 |
| C18:0 | 0.65 |
| C18:1 | 12.97 |
| C18:2 | 3.65 |
| C18:3 | 0.55 |

TABLE 3

High Oleic Algae Oil

| Fatty Acid | Wt. % |
| --- | --- |
| C10:0 | 0.01 |
| C12:0 | 0.02 |
| C14:0 | 0.38 |
| C15:0 | 0.01 |
| C16:0 | 3.87 |
| C16:1 | 0.18 |
| C17:0 | 0.04 |
| C18:0 | 3.73 |
| C18:1 | 88.7 |
| C18:2 | 0.99 |
| C18:3 | 0.17 |
| C20:0 | 0.25 |
| C20:1 | 0.28 |
| C20:2 | 0.45 |
| C22:0 | 0.05 |
| C24:0 | 0.02 |

The nomenclature used in Tables 1-3 would be readily understood by a person of ordinary skill in the art. For example, C18:0 means that the fatty acid is an 18 carbon chain with no ethylene group therein and C18:2 means that the fatty acid is an 18 carbon chain with 2 ethylene groups therein Algae oil-based alkoxylate compositions were produced via a transesterification reaction between each algae oil and an ethoxylated glycerin. For each algae oil, samples were produced by individually reacting the algae oil with ethoxylated glycerin having a level of ethoxylation over a range of 5 to 25 moles ethoxylation. In particular, each algae oil was individually reacted with ethoxylated glycerin having 5, 7, 10, 15, 20, and 25 moles ethoxylation.

To make the above-described examples, 68.9 g of ethoxylated glycerin was first mixed with 0.6 g of a potassium hydroxide having 45 wt. % active ingredients (commercially available from Ashta Chemicals, Inc., Ashtabula, Ohio) in a flask equipped with a heating mantle, thermocouple, overhead stirring, and nitrogen inlet. The composition was heated to about 120° C. under nitrogen and dried until the amount of water therein was less than 0.1%. The mixture was then cooled to 100° C. and either 29.5 g of high capric, high lauric, or high oleic algae oil was slowly added to the mixture over 60 minutes. The reaction was allowed to digest for 15 minutes at 100° C. before adding 1 g of a hydrogen peroxide having 35 wt. % active ingredients. The reaction mixture was then allowed to reach room temperature.

The resulting examples were then mixed with water and additional surfactants to form solutions comprising 88.5 wt. % water, 7 wt. % algae oil-based alkoxylate composition, 3 wt. % dodecylbenzenesulfonic acid, and 1.5 wt. % of TEA 99 (triethanolamine 99% from Dow). These solutions were then analyzed for detergency as compared to a solution of 88.5 wt. % water, 7 wt. % SURFONIC® L24-7, 3 wt. % dodecylbenzenesulfonic acid, and 1.5 wt. % TEA 99.

Figure 4:
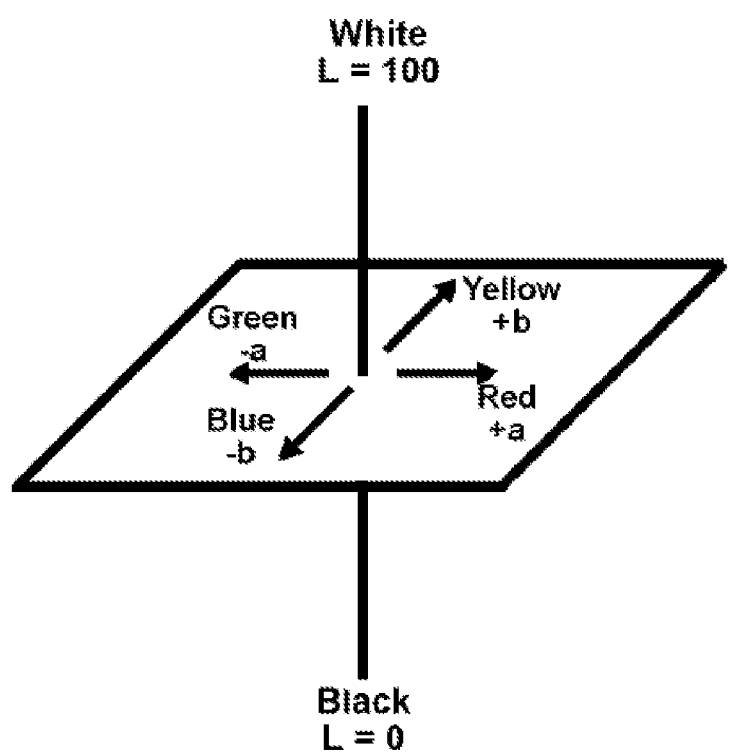
FIG. 4 is an illustration of the color scale used to assess detergency using a HunterLab Spectrophotometer.

The solutions were analyzed for detergency by using (i) a Tergotometer Detergent Tester ("tergotometer") from Copley Scientific (Nottingham, UK), (ii) soiled cloth swatches, and (iii) a HunterLab Spectrophotometer ("spectrophotometer"). First, various soiled swatches obtained from cotton and polyester/cotton test fabrics were read with a spectrophotometer. The different soils (i.e., redep, dirty motor oil, sebum, carbon black/olive oil, and clay) were tested in triplicates for each test fabric. As used herein, "redep" refers to bleached cotton swatches used to measure redeposition of, e.g., dirty motor oil, clay, etc. when testing. The data obtained are initial L, a, and b values, which depict a color scale as shown in FIG. 4.

The soiled swatches were then added to the tergotometer along with a 200 ppm surfactant solution of each example and 150 ppm hard water. A 15 minute wash cycle at 100 RPM and 37.78° C. was first used. Then, a 5 minute rinse cycle at 100 RPM and 37.78° C. was used. The tergotometer of choice had six 1-L temperature controlled buckets with mechanical agitation to stimulate what is happening in an actual washing machine. Testing was carried out with at least one control (described below) and water as a baseline. Following the rinse cycle, the swatches were placed flat on a mesh screen in an oven at 65° C. to dry. After the swatches were dried, they were read again on the spectrophotometer to obtain the final L, a, and b values.

Figure 5:
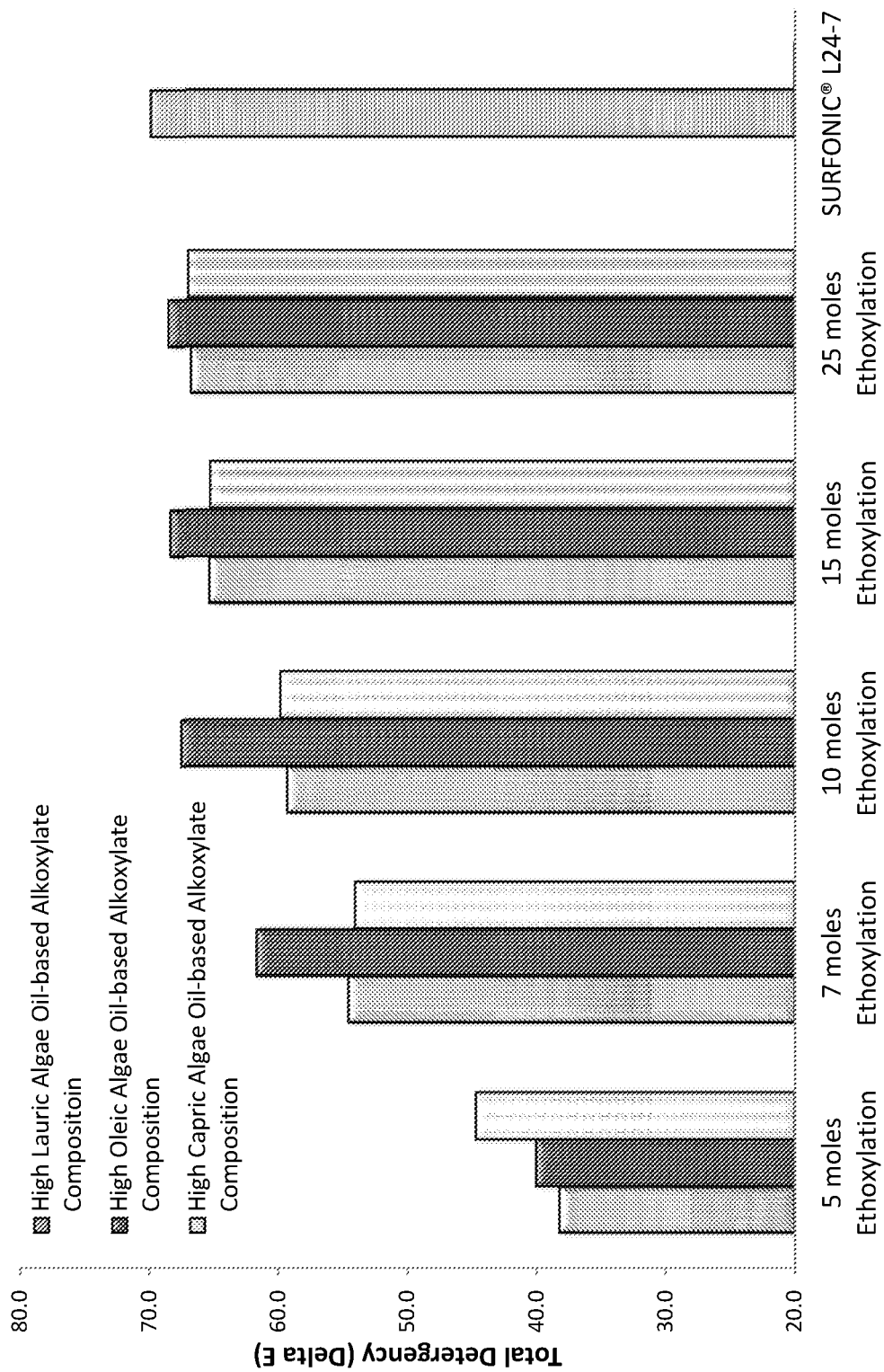
FIG. 5 is a graphical representation of the total detergency of several examples of the presently disclosed vegetable oil-based alkoxylate composition compared to SURFONIC® L24-7 surfactant.

The total detergency was then determined by adding the detergency measurements for all the different soils and fabrics for each solution. The results of such are shown in FIG. 5. As illustrated in FIG. 5, each form of algae oil-based alkoxylate composition, especially when formed using an ethoxylated glycerin having 10 to 25 moles ethoxylation, had similar detergency results as one of the leading commercial synthetic surfactants.

Figure 6:
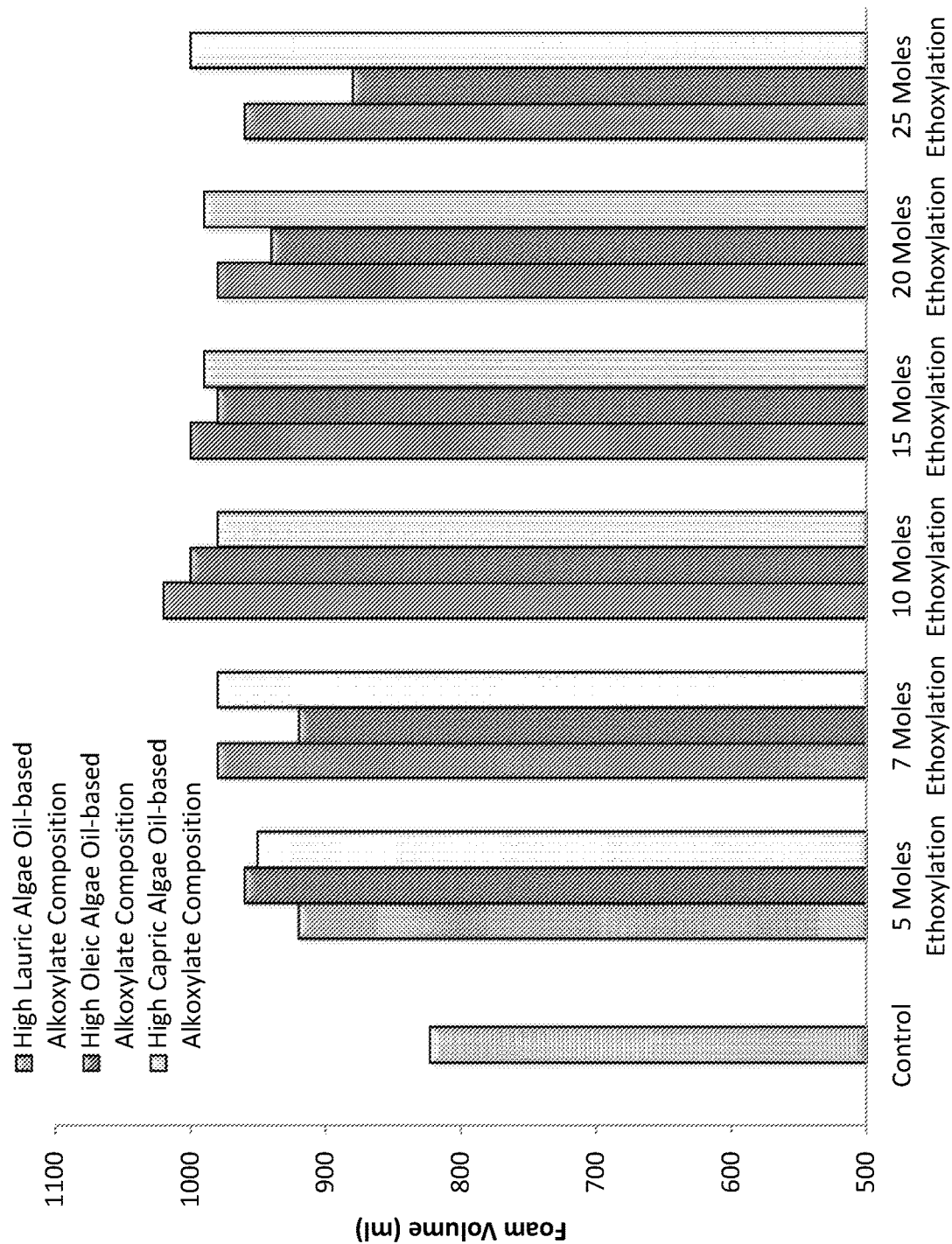
FIG. 6 is a graphical representation of the foam volume of several examples of the presently disclosed vegetable oil-based alkoxylate composition compared to a control surfactant solution comprising sodium lauryl ether sulfate ("SLES") and cocoamidopropyl betaine ("CAPB").

Additionally, the above-noted examples of algae oil-based alkoxylate compositions were analyzed for foaming height by first individually mixing each of the above-noted examples with water and additional surfactants to form surfactant solutions comprising 0.833 wt. % algae oil-based alkoxylate composition, 89.90 wt. % water, 0.33 wt. % NaCl, 4.76 wt. % EMPICOL® ESB-70 sodium lauryl ether sulfate (available from Huntsman Corp. or an affiliate thereof), and 4.17 wt. % EMPIGEN® BS/FA surfactant (an aqueous solution of a cocoamidopropyl betaine available from Huntsman Corp. or an affiliate thereof). 400 mL of each surfactant solution was then mixed for 10 seconds on maximum speed. The mixed surfactant solutions were individually poured into a graduate cylinder and then initially measured for foam volume and then once again after five minutes. The same was done for a comparative surfactant solution comprising 89.90 wt. % water, 0.33 wt. %, 4.76 EMPICOL® ESB-70 sodium lauryl ether sulfate, and 4.17 wt. % EMPIGEN® BS/FA surfactant. The results of such are shown in FIG. 6. As illustrated in FIG. 6, each form of algae oil-based alkoxylate composition, especially when formed using an ethoxylated glycerin having 10 to 25 moles ethoxylation, had similar foaming properties as the blend of commercial surfactants.

The ratio of vegetable oil and ethoxylated glycerin can be varied to change the ratio of (i) mono-, di-, and triacyl alkoxylated glycerides and (ii) unreacted glycerin in the resulting composition. To demonstrate this effect, the above-noted process was followed to produce an algae oil-based alkoxylate composition except that varying amounts of high lauric algae oil were reacted with varying amounts of ethoxylated glycerin having 10 moles or 25 moles ethoxylation (as detailed in Tables 4 and 5 below).

TABLE 4

| Reactants (wt. %) | | High Lauric Algae Oil-based Ethoxylate Composition | | | | Ratio of Mono-, Di-, and Triacyl |
| --- | --- | --- | --- | --- | --- | --- |
| | | Monoacyl | Diacyl | Triacyl | | Ethoxylated |
| Ethoxylated Glycerin (10 moles) | Soybean Oil | Ethoxylated Glyceride (wt. %) | Ethoxylated Glyceride (wt. %) | Ethoxylated Glyceride (wt. %) | Ethoxylated Glycerin (wt. %) | Glyceride to Ethoxylated Glycerin |
| 58.9 | 39.5 | 34.03 | 38.11 | 11.29 | 16.57 | 5.04 |
| 63.9 | 34.5 | 37.21 | 33.42 | 7.42 | 21.95 | 3.56 |
| 68.9 | 29.5 | 39.54 | 26.6 | 4.88 | 28.97 | 2.45 |
| 73.9 | 24.5 | 39.03 | 21.13 | 2.83 | 37.01 | 1.70 |
| 78.9 | 19.5 | 36.98 | 15.75 | 1.32 | 45.94 | 1.18 |
| 83.9 | 14.5 | 31.03 | 11.24 | 0.79 | 56.94 | 0.76 |
| 88.9 | 9.5 | 25.11 | 9.43 | 1.42 | 64.03 | 0.56 |

TABLE 5

| Reactants (wt. %) | | High Lauric Algae Oil-based Ethoxylate Composition | | | | Ratio of Mono-, Di-, and Triacyl Ethoxylated Glyceride to Ethoxylated Glycerin |
|---|---|---|---|---|---|---|
| Ethoxylated Glycerin (25 moles) | Soybean Oil | Monoacyl Ethoxylated Glyceride (wt. %) | Diacyl Ethoxylated Glyceride (wt. %) | Triacyl Ethoxylated Glyceride (wt. %) | Ethoxylated Glycerin (wt. %) | |
| 58.9 | 39.5 | 18.44 | 47.01 | 29.28 | 5.27 | 17.98 |
| 68.9 | 29.5 | 31.17 | 43.81 | 13.51 | 11.51 | 7.69 |
| 78.9 | 19.5 | 40.23 | 30.47 | 4.8 | 24.5 | 3.08 |
| 88.9 | 9.5 | 36.89 | 13.97 | 2.3 | 46.83 | 1.14 |

Soybean Oil

Soybean oil-based alkoxylate compositions were produced via a transesterification reaction between soybean oil and ethoxylated glycerin having 10 moles ethoxylation over a range of weight ratios of the ethoxylated glycerin to soybean oil, including 60/40, 70/30, 80/20, 85/15, 90/10 of ethoxylated glycerin to soybean oil.

To make the examples, the above-described procedure with respect to the algae oil-based alkoxylate compositions was used, substituting soybean oil for the algae oil.

Figure 7:
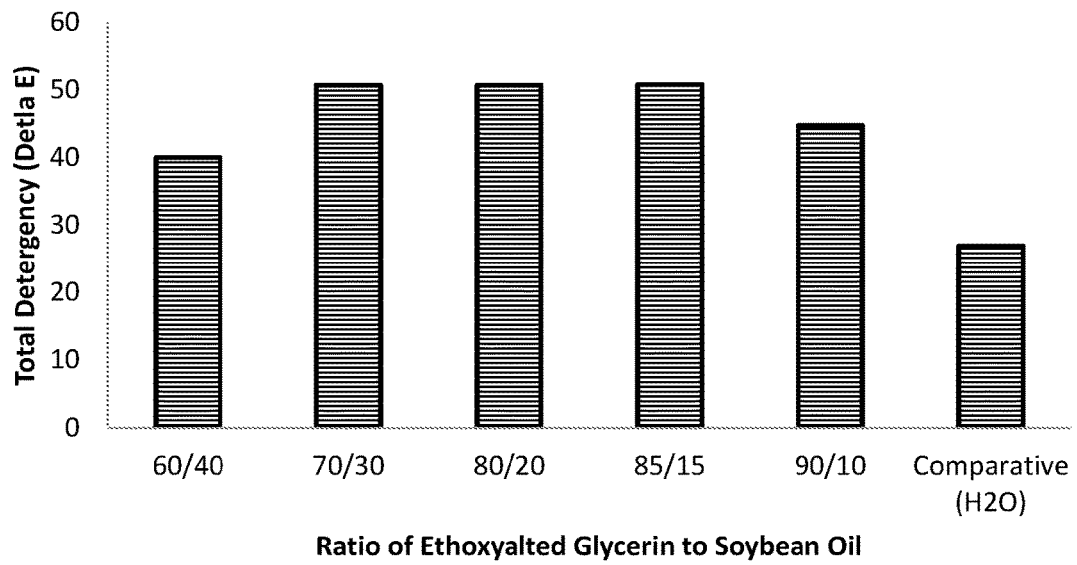
FIG. 7 is a graphical representation of the total detergency of several examples of the presently disclosed vegetable oil-based alkoxylate composition compared to water.

The resulting examples were then mixed with water to form solutions having 200 ppm of the surfactant. These solutions were then analyzed for detergency as compared to water using the same procedure set forth above for measuring detergency. The results are shown in shown in FIG. 7. As illustrated in FIG. 7, each form of soybean oil-based alkoxylate composition had better detergency results than the control comprising water.

Figure 8:
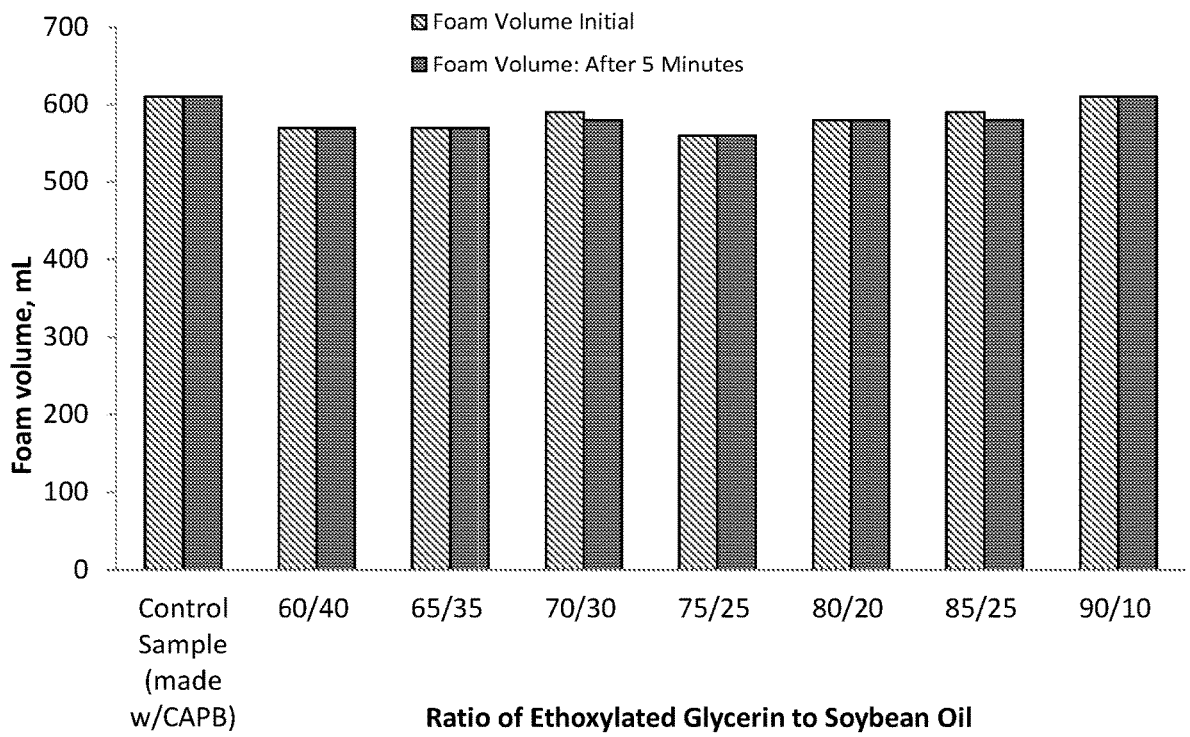
FIG. 8 is a graphical representation of the foam volume of several examples of the presently disclosed vegetable oil-based alkoxylate composition compared to a control surfactant solution comprising CAPB.

The above-noted soybean oil-based alkoxylate compositions were also analyzed for foaming height by first individually mixing 6.15 mL of each composition with 793.85 mL of water to form surfactant solutions. 200 mL of each surfactant solution was then mixed for 10 seconds on maximum speed. The mixed surfactant solutions were individually poured into a graduate cylinder and then initially measured for foam volume and then once again after five minutes. The same was done for a comparative surfactant solution comprising 6.15 mL CAPB and 793.85 mL water. The results of such are shown in FIG. 8. As illustrated in FIG. 8, each form of soybean oil-based alkoxylate composition had similar foaming properties as a solution of water and CAPB.

Soybean Oil as Ink Dispersant

Soybean oil-based alkoxylate compositions were produced via the transesterification reaction as set forth above but between soybean oil and ethoxylated glycerin having 10 moles ethoxylation and 25 moles ethoxylation at a weight ratio of 70/30 ethoxylated glycerin to soybean oil. The soybean oil-based alkoxylate compositions were then assessed as ink dispersants and compared to a leading commercial pigment dispersant, DISPERBYK® 190 dispersant, available from BYK Additives & Instruments (Wesel, Germany).

Each dispersant was combined with 25% pigment (blue pigment PB 15:4 commercially available from Heliogen Blue L7101F, BASF) and water in Speedmixer™ cups (commercially available from Flacktek, Landrum, S.C.; USA). The loading was controlled at 1:10 active dispersant to pigment mass ratio. The mixture was then pre-mixed in a Speedmixer™ for 30 seconds and then milled with 2 mm glass beads at 3000 rpm for 3 minutes. The supernatant colorant was set at about 20 to 25° C. overnight, and was used to tint a base paint (i.e., PPG Olympic One Interior Semi-Gloss Enamel(Base 1-356824)) at 3 wt. % of the loading in the base paint.

The tinted compositions were then letdown on a BYK BYKO coating char with a 4 mm BYK-Gardner drawdown bar. After the films dried, a BYK-Gardner spectrometer was used to evaluate color (tint) strength. The results of the color (tint) strength test are set forth in Table 6.

TABLE 6

| Dispersant | Color Strength |
|---|---|
| DISPERBYK® 190 dispersant | 100% |
| Soybean Oil Ethoxylated Glycerin (10 moles) | 99% |
| Soybean Oil Ethoxylated Glycerin (25 moles) | 102% |

Table 6 illustrates that the vegetable oil-based alkoxylate compositions enable acceptable flowability and tinting power comparable to the commercial standard.

From the above description, it is clear that the present disclosure is well adapted to carry out the object and to attain the advantages mentioned herein as well as those inherent in the present disclosure. While exemplary embodiments of the present disclosure have been described for the purposes of the disclosure, it will be understood that numerous changes may be made which will readily suggest themselves to those skilled in the art which can be accomplished without departing from the scope of the present disclosure and the appended claims.

What is claimed is:

1. A vegetable oil-based alkoxylate composition, comprising a mixture of:

Monoacyl alkoxylated glyceride having a Formula I:

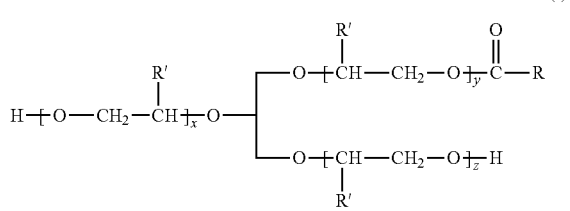

(I)

Diacyl alkoxylated glyceride having a Formula II:

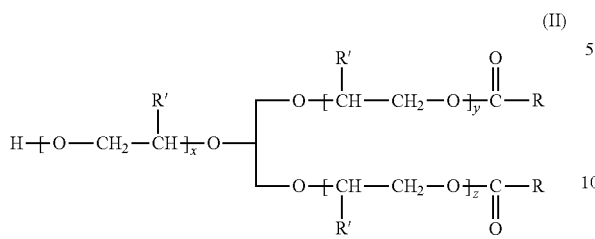

(II)

Triacyl alkoxylated glyceride having a Formula III:

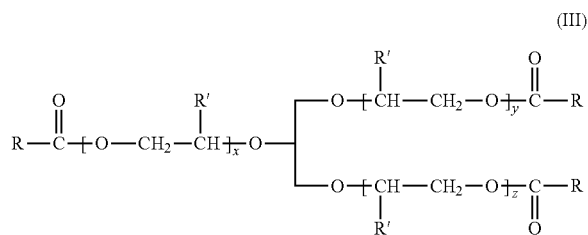

(III)

and
Alkoxylated glycerin having a Formula IV:

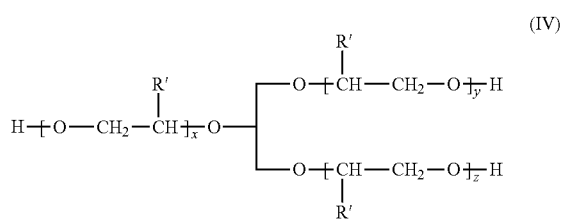

(IV)

wherein R is a $C_8$-$C_{24}$ saturated or unsaturated alkyl group; R' is H, $CH_3$, $CH_2CH_3$, or a combination thereof; and x, y, and z each range from 2 to 100 and the sum of x, y, and z is in a range of from 6 to 300 for each of Formulas I, II, III, and IV, and wherein the weight ratio of (a) the total amount of mono-, di-, and triacyl alkoxylated glycerides having Formulas I, II, and III to (b) the amount of alkoxylated glycerin having Formula IV is between 3.5:1 and 27:1.

2. The composition of claim 1, wherein the weight ratio of (a) the total amount of mono-, di-, and triacyl alkoxylated glycerides having Formulas I, II, and III to (b) the amount of alkoxylated glycerin having Formula IV is between 3.5:1 and 4:1.

3. The composition of claim 1, wherein R' is H.

4. The composition of claim 1, wherein the sum of x, y, and z for each of Formulas I, II, III, and IV is in a range of from 10 to 25.

5. The composition of claim 1, wherein the composition has a hydroxyl value in a range of from 75 to 350.

6. A cement mortar composition comprising a cement and the composition of claim 1.

7. A pigment dispersion, comprising:
a pigment,
a solvent, and
the composition of claim 1.

8. A detergent composition, comprising:
the composition of claim 1; and
at least one of a surface active agent, an enzyme, an enzyme stabilizer, a hydrotrope, a rheology modifier, an anti-redeposition polymer, an optical brightener, a preservative, a dye, and a fragrance.

9. An agrochemical formulation comprising:
the composition of claim 1; and
a pesticidally effective amount of a pesticide or a mixture of pesticides.

* * * * *